US012451635B2

(12) United States Patent
Chen et al.

(10) Patent No.: US 12,451,635 B2
(45) Date of Patent: Oct. 21, 2025

(54) ELECTRICAL FEMALE TERMINAL

(71) Applicant: J.S.T. CORPORATION, Farmington Hills, MI (US)

(72) Inventors: Ping Chen, Novi, MI (US); Gwendolyn Upson, Ypsilanti, MI (US); Craig Lee, Farmington Hills, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 0 days.

(21) Appl. No.: 17/401,869

(22) Filed: Aug. 13, 2021

(65) Prior Publication Data

US 2022/0399666 A1 Dec. 15, 2022

Related U.S. Application Data

(60) Provisional application No. 63/209,796, filed on Jun. 11, 2021.

(51) Int. Cl.
*H01R 13/05* (2006.01)
*H01R 13/187* (2006.01)

(52) U.S. Cl.
CPC ......... *H01R 13/055* (2013.01); *H01R 13/187* (2013.01)

(58) Field of Classification Search
CPC .... H01R 13/432; H01R 13/187; H01R 13/18; H01R 13/055
See application file for complete search history.

(56) References Cited

U.S. PATENT DOCUMENTS 5,545,062 A 8/1996 Takagishi
7,950,972 B1 5/2011 Chen
(Continued)

FOREIGN PATENT DOCUMENTS

WO WO-2014127817 A1 * 8/2014 ........... H01R 13/432
WO 2015/110661 A1 7/2015
WO 2017/140857 A1 8/2017

OTHER PUBLICATIONS

International Search Report for International Application No. PCT/US2021/046545 dated Nov. 9, 2021 (3 sheets).
(Continued)

*Primary Examiner* — Renee S Luebke
*Assistant Examiner* — Paul D Baillargeon
(74) *Attorney, Agent, or Firm* — Kratz, Quintos & Hanson, LLP

(57) ABSTRACT

An electrical female terminal for mating with a connector assembly generally including a main body, a two-bodied spring, A protrusion extends from an unattached end portion of the lever member, the protrusion having faces angled relative to each other to efficiently deflect the lever member upwards when the protrusion interacts with an internal protrusion of a housing or a connector assembly, which in turn makes the electrical female terminal more difficult to remove from the housing or the connector assembly to thereby protect the electrical female terminal against the electrical female terminal from falling out during use. A top portion of the retainer member of the electrical female terminal, located above the two-bodied spring, has a dimple portion to increase the number of contacts to an upper spring of the two-bodied spring, so as to increase the stiffness of the two-bodied spring. The terminal face or leading end portion of the electrical female terminal is prevented from damaging or cutting a silicone seal, which seals the connector assembly from environmental contaminants, during mating therewith by providing thereon a recessed top face portion and a recessed bottom face portion. The overstress feature of the tang member of the lever is improved upon by relocating and reshaping the protruding member thereof.

32 Claims, 22 Drawing Sheets

(56) References Cited

U.S. PATENT DOCUMENTS

| | | | |
|---|---|---|---|
| 7,976,351 B2 | 7/2011 | Boemmel | |
| 7,988,505 B2 * | 8/2011 | Hotea .................... | H01R 13/11 439/852 |
| 9,153,879 B2 | 10/2015 | Frimmersdorf et al. | |
| 9,799,976 B2 | 10/2017 | Lehner | |
| 10,122,108 B2 | 11/2018 | Bhagyanathan Sathlanathan et al. | |
| 10,522,934 B2 | 12/2019 | Zhang | |
| 2003/0060091 A1 | 3/2003 | Fukatsu | |
| 2004/0209527 A1 | 10/2004 | Chen | |
| 2010/0041283 A1 | 2/2010 | Hernandez | |
| 2010/0210154 A1 | 8/2010 | Boemmel | |
| 2012/0142233 A1 | 6/2012 | Blasko | |
| 2016/0322728 A1 | 11/2016 | Endo | |
| 2017/0324184 A1 | 11/2017 | Lehner et al. | |
| 2018/0212340 A1 | 7/2018 | Bhagyanathan-Sathlanathan et al. | |
| 2021/0066836 A1 | 3/2021 | Chen | |

OTHER PUBLICATIONS

International Search Report for International Application No. PCT/US2022/012968 dated May 3, 2022 (3 sheets).
International Preliminary Report on Patentability for International Application No. PCT/US2020/048360 dated Jun. 30, 2021 (8 sheets).
International Search Report for International Application No. PCT/US2020/048360 dated Nov. 19, 2020 (3 sheets).
CTX50 Mat Sealed Receptacle Terminal; Molex; Apr. 2021; https://www.molex.com/pdm_docs/ps/PS-34905-0001-001.pdf (12 sheets).
CTX50 Sealed RCPT Term; Molex; Jun. 2021; https://www.molex.com/pdm_docs/sd/349052447_sd.pdf (1 sheet).

* cited by examiner

ELECTRICAL FEMALE TERMINAL

BACKGROUND OF THE INVENTION

It is desired that an electrical female terminal be provided with structural arrangements or features including; overstress protection using support members which prevent undesired deformation of the electrical female terminal; a shape having an orientation or polarity of the electrical female terminal as defined by a main body; a wire fastening feature using a wire fastening portion of the electrical female terminal for securing a wire; a locking feature using a tang member to fasten and assure the electrical female terminal is locked within a housing; a spring feature using a two-bodied spring which efficiently and resiliently connects the electrical female terminal with a male pin or male terminal, or further "blade-like" object; and a guiding feature using a guide member to direct and "self-correct" the male pin or male terminal, or further "blade-like" object into the electrical female terminal. Additionally, the electrical female terminal of the present invention can accommodate and can receive a TPA device within a space above the wire fastening portion thereof and located behind the main body.

Further, the two-bodied spring of the present invention is "two-bodied" wherein the application or orientation uses a lower spring member and an upper spring member. Preferably, the lower spring member and upper spring member operate in unison or together and in total, to provide a spring force applied to or acting upon to the male pin or male terminal, or further "blade-like" object, when one of such aforementioned objects is being inserted into the female electrical terminal. The lower spring member extends further along a lengthwise direction of the pin and further downward and towards a floor of the main body, than the upper spring member. The upper spring member and lower spring members are integrally structured with each other and connected by curved side members and folded one above the other. The lower spring member is below the upper spring member, and the upper spring member is above the lower spring member, respectively. The relationship between the unflexed orientation of the upper and the lower spring member is provided wherein they may or may not contact. When the lower and upper spring members are in contact in an unflexed state, the initial applied spring force will be evident as that of both the upper and lower spring members, applying their respective spring forces in unison or together and in total against the male pin or male terminal, or further "blade-like" object. In contrast, when the lower and upper spring members do not contact in an unflexed orientation, the initial applicable spring force against the male pin or male terminal, or further "blade-like" object will be evident solely as that of the lower spring member spring force, that is until the lower spring member makes contacts with the upper spring member, whereby the upper spring member will apply a spring force against the lower spring and in unison or together and in total against the male pin or male terminal, or further "blade-like" object. Additionally, in one instance of the present invention, as the spring travels upward, the lower spring member may flex and contact the tang member, the tang member may additionally provide a resistance against the upward movement of the lower spring member, thereby applying a resilient force against its upward travel, and consequently the tang member increases the total spring force of the spring. The above described orientations of the spring are provided to efficiently and resiliently connect and secure the electrical female terminal with the male pin or male terminal, or further "blade-like" object, as necessary and or in operation.

It is also desired that the shape of the electrical female terminal of the present invention has an orientation or polarity that is maintained and ensured, and is provided in order to mate the electrical female terminal with a corresponding connector assembly, one which has an opening with a similar orientation or similar polarity to that of the electrical female terminal, respectively, for proper fitting and mating therewith.

Such an electrical female terminal is shown in U.S. Patent Application Publication No. US 2021/0066836 published on Mar. 4, 2021, which is issued to the applicant of the instant case. The electrical female terminal in the instant case improves upon the teachings of the electrical female terminal shown in U.S. Patent Application Publication No. US 2021/0066836.

It is thus further desired in the electrical female terminal of this invention that a protrusion extends from an unattached end portion of a lever member, the protrusion having faces angled relative to each other to efficiently deflect the lever member upwards when the protrusion interacts with an internal protrusion of a housing or a connector assembly, which in turn makes the electrical female terminal of this invention more difficult to remove from the housing or the connector assembly to thereby protect the electrical female terminal against the electrical female terminal from falling out during use.

It is also desired for a top portion of the retainer member of the electrical female terminal of this invention, located above the two-bodied spring, to have a dimple portion to increase the number of contacts to an upper spring of the two-bodied spring, so as to increase the stiffness of the two-bodied spring.

It is also desired to avoid the terminal face or leading end portion of the electrical female terminal from damaging or cutting a silicone seal, which seals the connector assembly from environmental contaminants, during mating therewith by providing a recessed top face portion and a recessed bottom face portion.

In order to improve the overstress feature of the tang member of the lever member, it is further desired that the overstress feature, which includes a protruding member, is located at an intermediate portion or a middle portion of the tang member. Such a structural arrangement improves interaction with the tip of the tang member when the electrical female terminal of this invention is in use. Furthermore, the overstress feature of the tang member includes a protruding member having a lower edge being substantially flat or extending along a substantially horizontal direction to improve quality control (i.e., easier to measure the structural and functional characteristics thereof) during the manufacturing of the electrical female terminal.

SUMMARY OF THE INVENTION

This invention provides the electrical female terminal for mating with a male pin or male terminal or further "blade-like" object as well as mating and locking with a connector assembly. The electrical female terminal generally includes a main body, a two-bodied spring, and a wire fastening portion.

The main body of the electrical female terminal has a shape or form that is substantially box-shaped, whereby a portion of the main body is formed into a box like orientation. The main body generally includes an upper and a lower main body, a tang member and the two-bodied spring. The tang member includes a lever member which locks the electrical female terminal within the connector assembly. The lever member has a protruding member which meets another protruding member, extending from the main body, when the lever member is flexed. Both protruding members act as an overstress protection for the lever member; i.e., to prevent or protect the lever member from becoming deformed when the electrical female terminal is being mated with the connector assembly. Another protruding member extends from the lever member to protect the two-bodied spring from becoming overstressed. The main body is also comprised of a support member at both front and back ends thereof, which prevent overstress and deformation of the electrical female terminal.

Furthermore, a protrusion extends from an unattached end portion of the lever member, the protrusion having faces angled relative to each other to efficiently deflect the lever member upwards when the protrusion interacts with an internal protrusion of a housing or a connector assembly, which in turn makes the electrical female terminal of this invention more difficult to remove from the housing or the connector assembly to thereby protect the electrical female terminal against the electrical female terminal from falling out during use.

A top portion of the retainer member of the electrical female terminal of this invention, located above the two-bodied spring, has a dimple portion to increase the number of contacts to an upper spring of the two-bodied spring, so as to increase the stiffness of the two-bodied spring.

The terminal face or leading end portion of the electrical female terminal is prevented from damaging or cutting a silicone seal, which seals the connector assembly from environmental contaminants, during mating therewith by providing thereon a recessed top face portion and a recessed bottom face portion.

In order to improve the overstress feature of the tang member of the lever member, the overstress feature, which includes a protruding member, is located at an intermediate portion or a middle portion of the tang member. Such a structural arrangement improves interaction with the tip of the tang member when the electrical female terminal of this invention is in use. Furthermore, the overstress feature of the tang member includes a protruding member having a lower edge being substantially flat or extending along a substantially horizontal direction to improve quality control (i.e., easier to measure the structural and functional characteristics thereof) during the manufacturing of the electrical female terminal.

The two-bodied spring is substantially located within a passageway PW of the main body, and includes two members, which act or operate to create a spring force which can be applied to a male pin or male terminal, or further "blade-like" object, when one of such aforementioned objects is being inserted into the female electrical terminal.

The electrical female terminal of this invention also has an orientation or polarity which is maintained and ensured for proper fitment into a corresponding connector assembly. The connector assembly has an opening with a similar orientation or similar polarity which is also maintained for proper fitting with the electrical female terminal.

Additionally, a front portion of the wire fastening portion has a neck member which transitions to the main body of the electrical female terminal, with a space thereof for accommodating a TPA device.

BRIEF DESCRIPTION OF THE DRAWINGS

FIG. 5A illustrates an opening of the front end portion of the electrical female terminal and a guide member for guiding a male terminal pin or male terminal upon entry therethrough and into a passageway, while

FIG. 6A is a cross-sectional view taken along line 6A-6A in FIG. 1B, while

DETAILED DESCRIPTION OF THE PREFERRED EMBODIMENTS

Figure 1A:
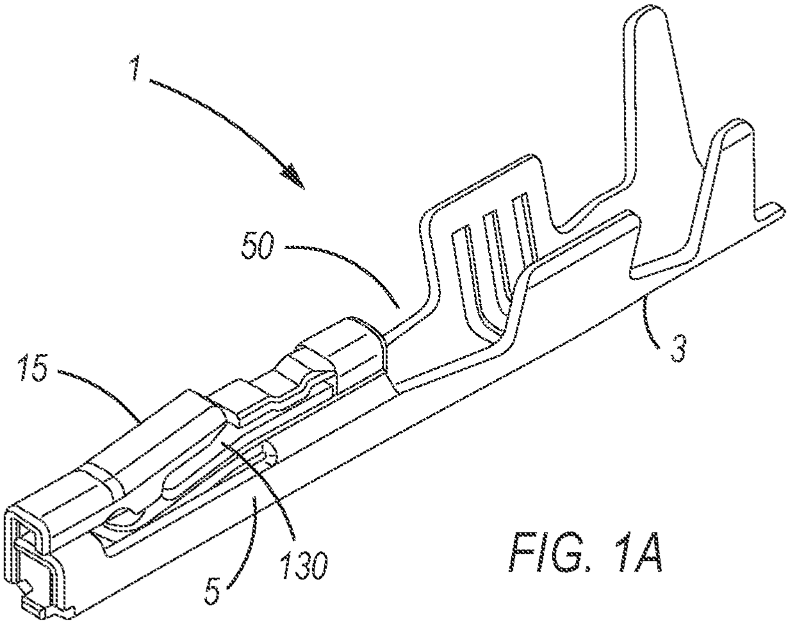
FIG. 1A is a front top perspective view of the electrical female terminal of this invention.

FIG. 1A shows a front top perspective view of the electrical female terminal, generally referred to as reference number 1. The electrical female terminal 1 is integrally formed as a continuous piece, being folded, creased, or curved, to form a single construct, and one which includes a main body 5, a two-bodied spring 130, and a wire fastening portion 3. The main body 5 further includes a tang member 15. The wire fastening portion 3 may be of a foldable crimp or clamping type as shown here, but may further be of an insulation displacement contact (IDC) type, or other similarly formed wire fastening means being integrally formed and preferably extending substantially with or in the lengthwise direction of the electrical female terminal 1, and more specifically extending from a rear portion of the main body 5 of the electrical female terminal 1 which is able to interact with an wire insulation portion 120 and or wire core portion 110 of the electrical wire or cable 100 to securely connect the electrical wire or cable 100 to the electrical female terminal 1. Further, an additional or sole wire fastening of the electrical wire or cable 100 to the electrical female terminal 1 may be accomplished by including means of creating a secure and or an electrically conductive fastening by including but not limited to, for example, welding, brazing, soldering and or other similar means.

Figure 1B:
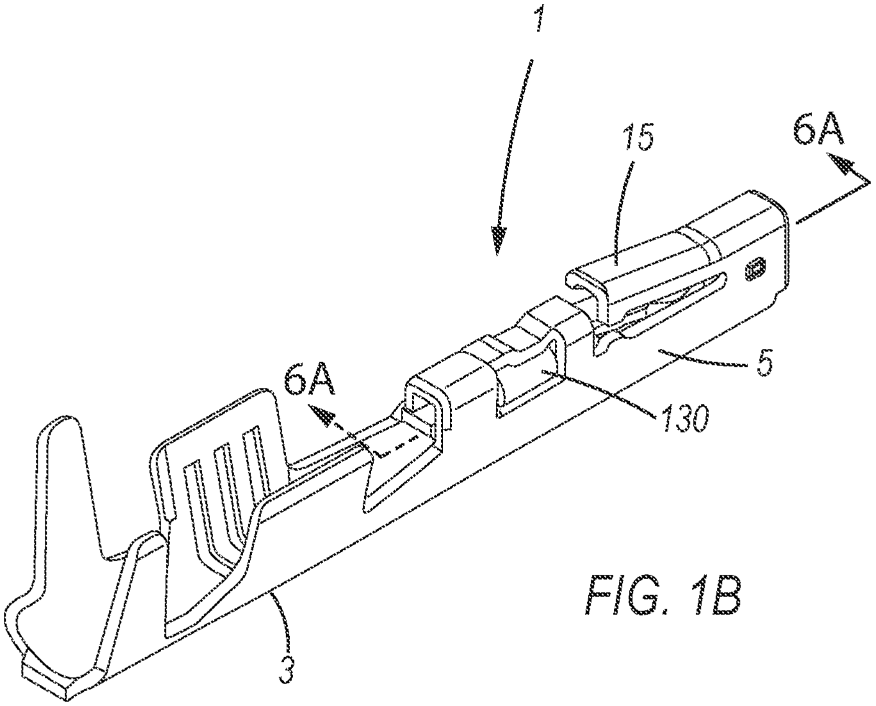
FIG. 1B is a back top perspective view of the electrical female terminal of this invention.

Illustrated in more detail, is a back top perspective view of the electrical female terminal 1 in FIG. 1B, are the tang member 15 and the two-bodied spring 130. It is preferable that the main body 5 has a shape or form that is substantially box-shaped in the lengthwise direction, and similarly, in a direction opposite the lengthwise direction of the electrical female terminal 1, whereby a substantial portion of the main body 5 is formed into a box like orientation or construct, although the shape or form thereof is not restricted thereto (See, FIGS. 1A, 1B, 5A).

Figure 2A:
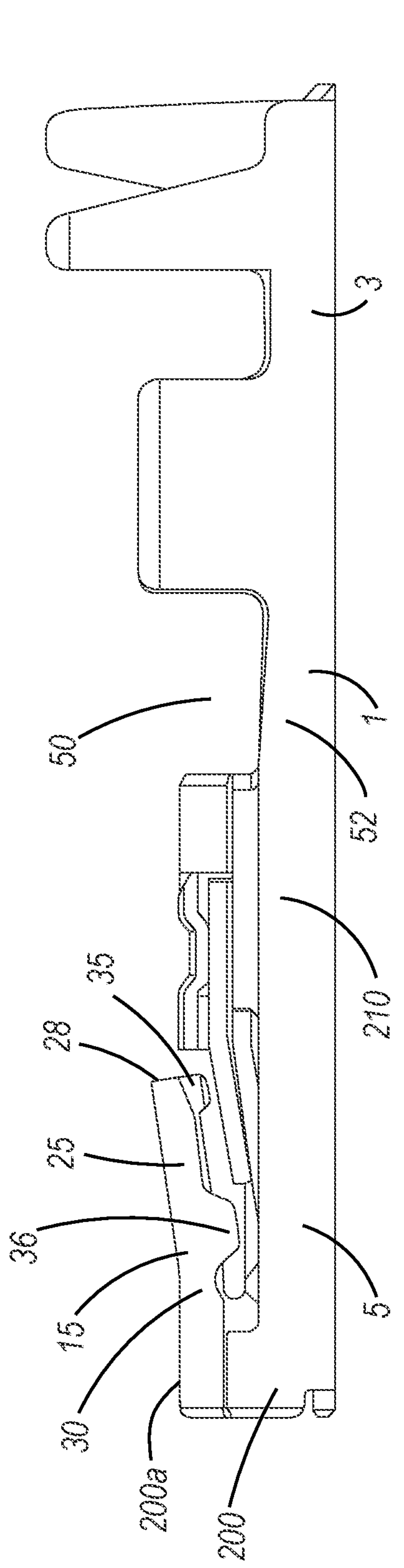
FIG. 2A is right side elevational view of the electrical female terminal of this invention.
Figure 2B:
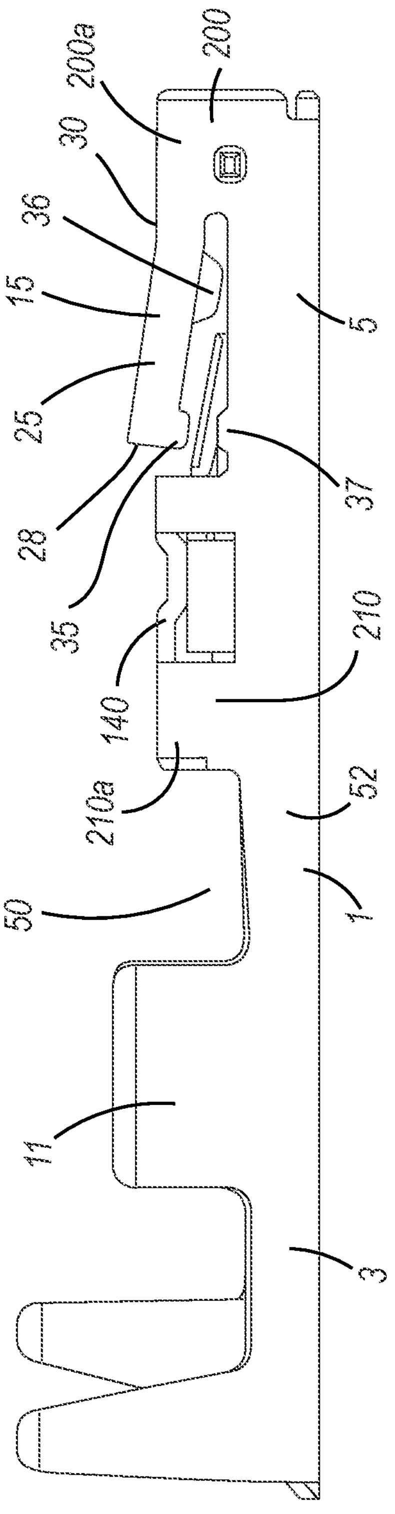
FIG. 2B is a left side elevational view of the electrical female terminal of this invention.
Figure 3A:
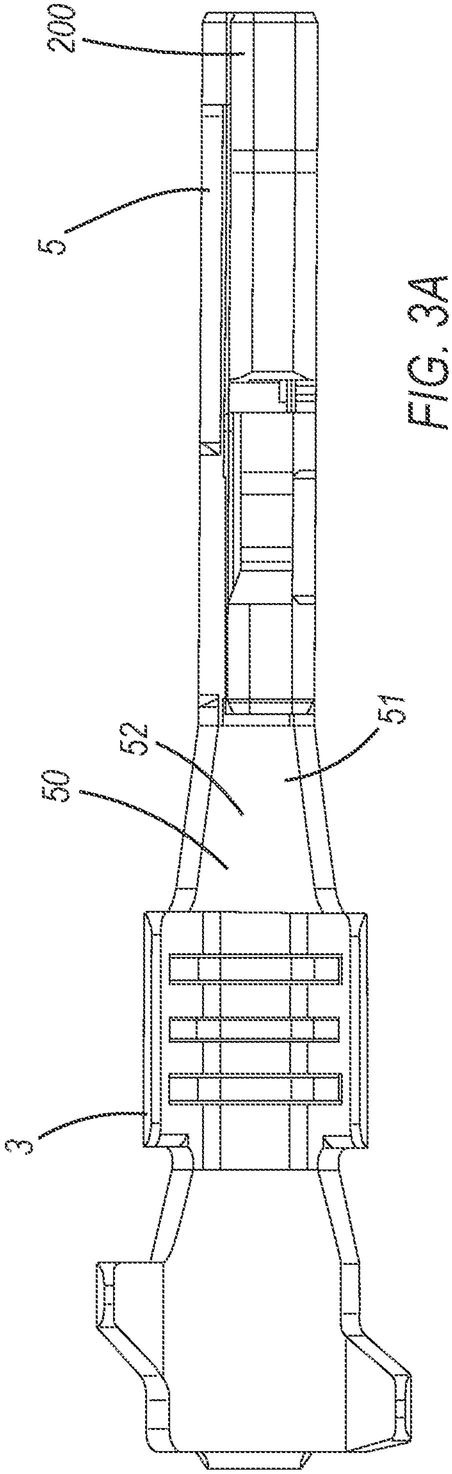
FIG. 3A is a top elevational view of the electrical female terminal of this invention.
Figure 3B:
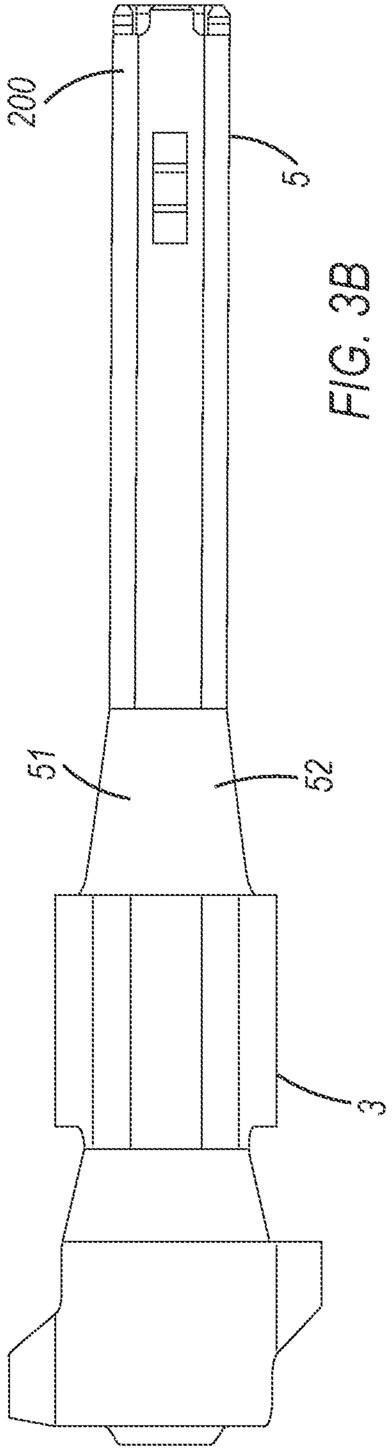
FIG. 3B is a bottom elevational view of the electrical female terminal of this invention.

As illustrated in FIGS. 2A and 2B, the wire fastening portion 3 transitions to and is integrally formed with and to the main body 5 by a neck member 52 (see also, FIGS. 3A, 3B).

As illustrated in FIG. 2A, the tang member 15 includes a lever member 25, the lever member 25 having an unattached end portion 28 and an attached end portion 30. As further seen in FIGS. 2A and 2B, the lever member 25, is shown here in a normal, relaxed state. The lever member 25 is resiliently biased to the normal relaxed state whereby, it is not being influenced by outside contact, and whereby the point of subsequent flex of lever member 25 may occur at the attached end portion 30 when the unattached end portion 28 is moved. The unattached end portion 28 of the lever member 25 preferably has, in a cross-section along a width thereof, a substantially U-shaped form, or the like, although the form thereof is not restricted thereto (see, FIGS. 1B, 5B). The attached end portion 30 of the lever member 25 preferably has, a substantially L-shaped form or the like, although the form thereof is not restricted thereto (see, FIG. 1B, 5A, 5B).

Figure 8A:
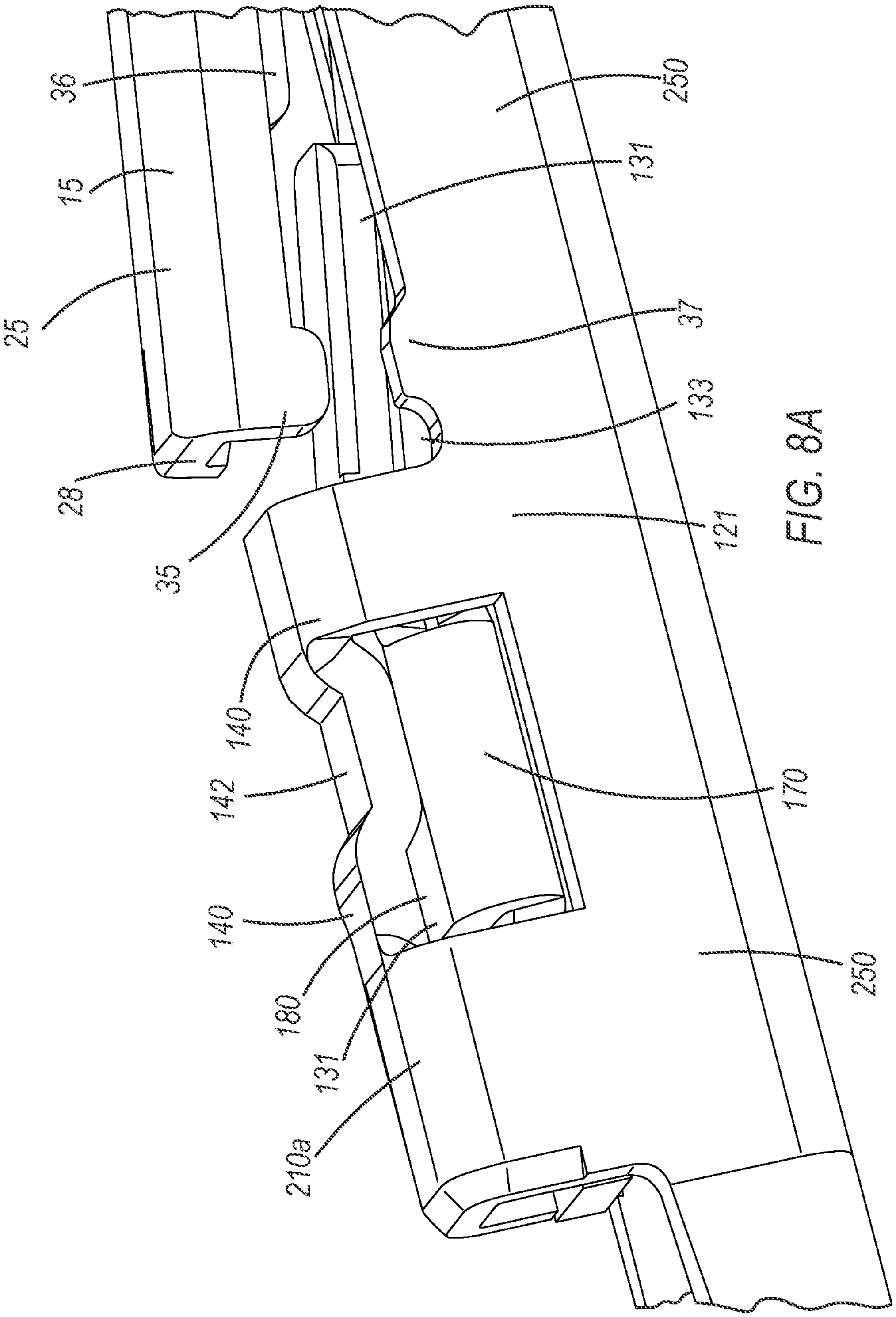
FIG. 8A shows, in part, a side of the electrical female terminal having a window for at least partially accommodating a curved side member of the two-bodied spring.
Figure 10A:
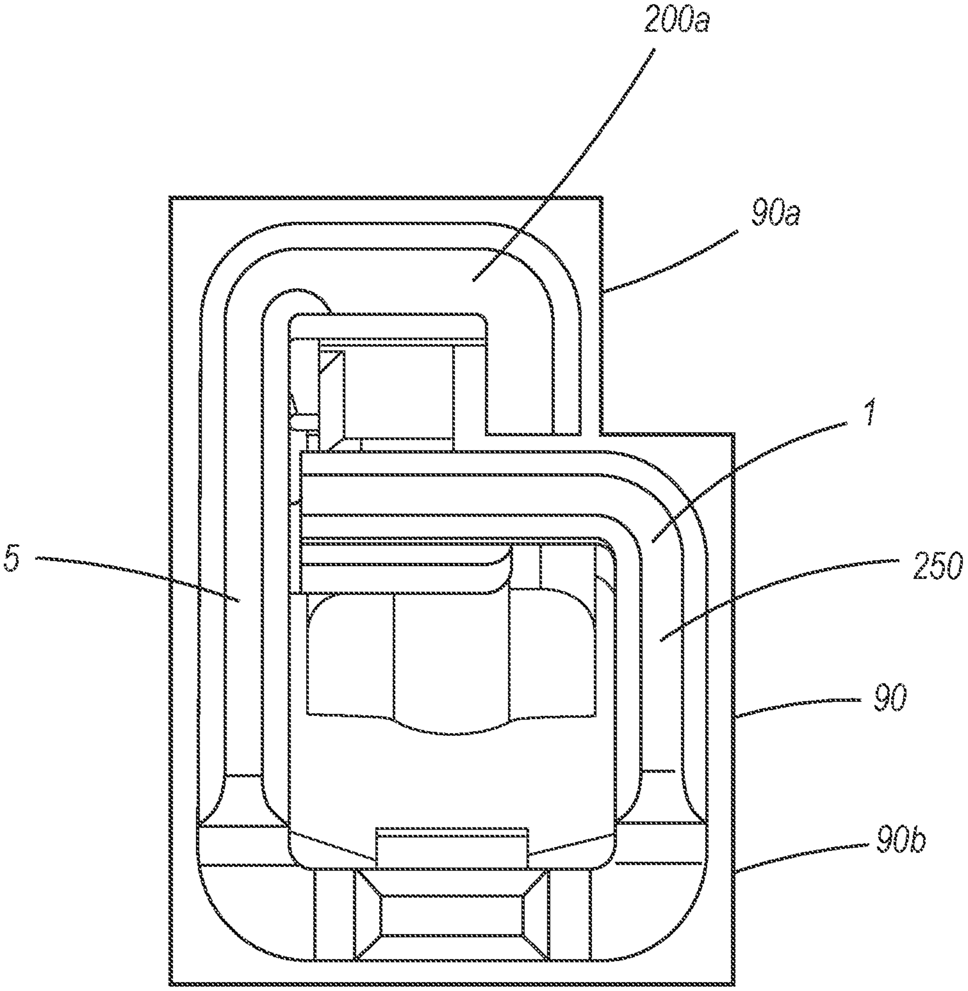
FIG. 10A shows a front elevational view of the electrical female terminal of this invention at pre-lock position within the connector assembly.
Figure 10B:
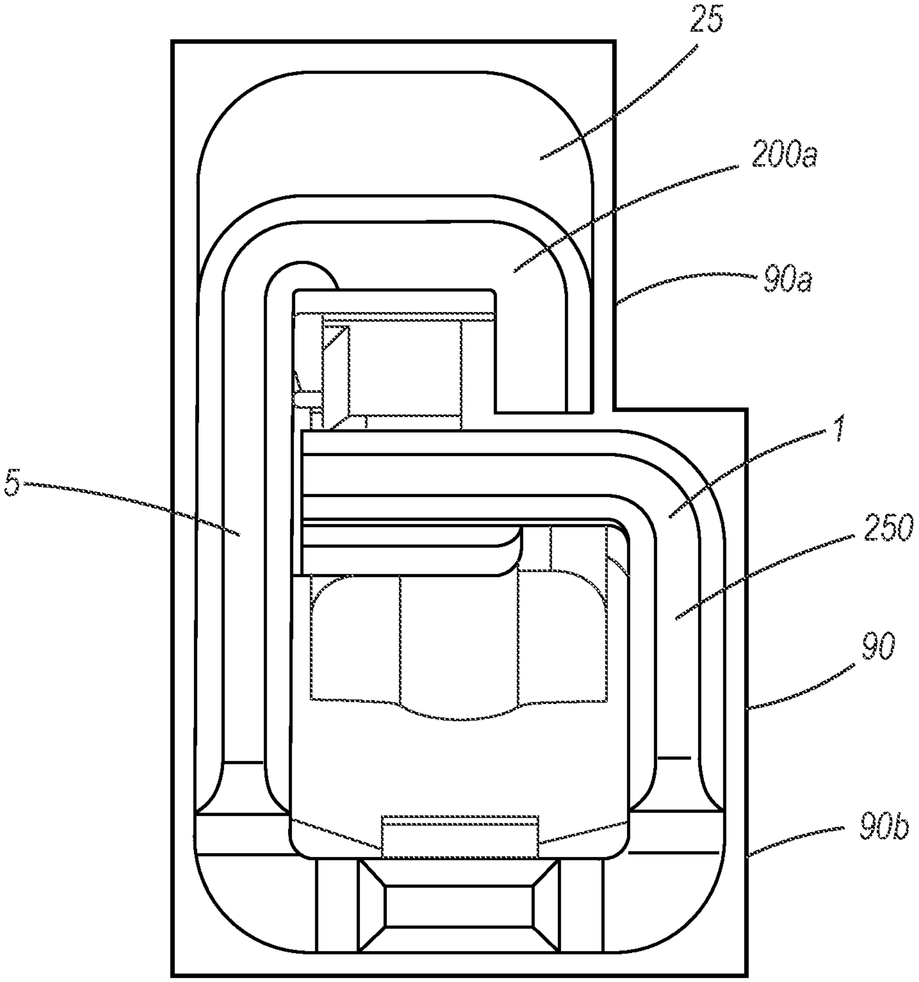
FIG. 10B shows a front elevational view of the electrical female terminal of this invention fully rested and at a full-lock position within the corresponding connector assembly, FIGS. 10A and 10B further showing the polarities or orientations of the electrical female terminal of this invention and the corresponding connector assembly for effective fitting therewith.

Further, the lever member 25 has a protruding member 35, which meets another protruding member 37 that extends from the main body 5 (see, FIGS. 1B, 2B, and 8A). Both protruding members 35, 37 act as an overstress protection for the lever member 25. That is, the protruding members 35, 37 impinge against each other, when the lever member 25 is in a flexed state. This form thereby prevents or protects the lever member 25 from becoming deformed when the female terminal 1 contacts or mates with a connector assembly 90 or the like (see also, FIGS. 10A and 10B). As such, the lever member 25 is operative to substantially move between a flexed state and a normal, relaxed state whereby it may return to the normal, relaxed state without being substantially deformed, or be inoperable, and still able to secure the female electrical terminal 1 with a connector housing 90, as discussed later (FIGS. 10A, 10B). As seen at the side elevational view of FIG. 2B, the protruding members 35, 37 are preferably substantially rectangular, round, trapezoid, or the like (see also, FIGS. 4, 8A), although the shape or form thereof is not restricted thereto.

In operation, when the electrical female terminal 1 enters the connector assembly 90, the unattached end portion 28 of the lever member 25 is freely pushed downward and moves from the normal relaxed state, to a flexed state (that is, the protruding member 35 approaches the another protruding member 37) (see, FIG. 10A). Upon full insertion of the electrical female terminal 1 into the connector assembly 90, the unattached end portion 28 of the lever member 25 freely moves upward, with a return to a normal, relaxed state of the lever member 25 (that is, the protruding member 35 moves away from the another protruding member 37 and when the lever member 25 is resiliently biased back to its normal, relaxed state) (see, FIGS. 2A, 10B). Further, the unattached end portion 28 is preferably thereby impinged onto a member (not shown) inside the connector assembly 90, locking and securing therein the electrical female terminal 1. Such a structural arrangement, which has the unattached end portion 28 of the lever member 25 impinged inside the connector assembly 90, acts as a locking and securing feature of the electrical female terminal 1 with the connector assembly 90 (see, FIG. 10B). The lever member 25 and the unattached end portion 28 may be further freely movable in an upward direction away from the normal, relaxed state, and flex away from a floor 122 of main body 5, and as will be discussed later, if the lever member 25 is flexed upward this may result in a resistance in a direction back to the normal relaxed state of the lever member 25. If the two-bodied spring 130 pushes or contacts the lever member 25 to the aforementioned flexed state, the lever member 25 can act upon the two-bodied spring 130 and add to the spring force of the two-bodied spring 130. This, notably, when the two-bodied spring 130 is flexed upward and away from the floor 122 and makes contact the lever member 25 and more specifically as the two-bodied spring 130 interacts with a male pin or male terminal, or further "blade-like" object.

As seen in FIG. 1A, a protruding member 36 also extends from a side of the lever member 25. Protruding member 36 is located substantially above, and further may engage with, a lower spring member 133, and even further provide overstress protection for the lower spring member 133, and generally the two-bodied spring 130, as will be discussed in more detail later (see, e.g., FIGS. 1A, 2A, 6A and 8A). The protruding member 36 moves freely and unobstructed within the movement of the lever member 25, when the lever member 25 moves in a downward travel from its normal, relaxed state, into a flexed state toward the two-bodied spring 130 and a floor 122 of the main body 5. Protruding member 36 is preferably substantially rectangular, round, trapezoid, or the like (see, FIG. 6A), although the shape or form thereof is not restricted thereto. Additionally, and with respect to the side of the lever member 25 from which protruding member 35 extends, protruding member 36 extends on an opposite side thereof of lever member 25, as well as on a different portion and having a different orientation with respect to the side of the lever member 25 from which the protruding member 35 extends, more specifically, the protruding member 36 is closer to the attached end portion 30 and the protruding member 35 is closer to the unattached end portion 28 when comparing their location along the lever member 25 (see, FIGS. 4, 6A, and 8A). The protruding member 36 and the protruding member 35 are positioned along the lever member 25 wherein they are neither mirror images, nor directly opposed, and further thus do not have portions thereof, respectively, which are mirror images or directly opposed, therefore no portions thereof of protruding member 36 and protruding member 35 overlap along the lengthwise direction of the electrical female terminal 1 (see, FIGS. 2A, 2B).

Figure 2C:
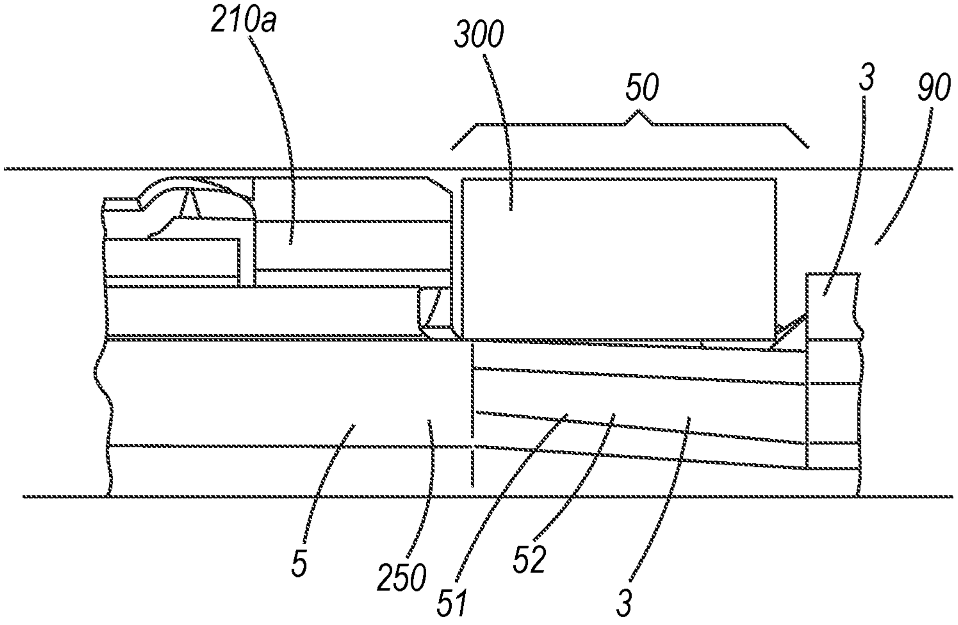
FIG. 2C shows a terminal position assurance (TPA) device positioned in a space of the electrical female terminal.

As also seen in FIGS. 1A, 1B, 2A and 2B, the wire fastening portion 3 of the electrical female terminal 1 has a space or transition area 50 above the neck member 52. The space or transition area 50 is located at a front portion 51 of the wire fastening portion 3, and behind the main body 5. When the electrical female terminal 1 is fully inserted into the connector assembly 90, a space or transition area 50 is thereby available for accommodating therein a terminal position assurance (TPA) device 300 (see, FIG. 2C) for assuring that the electrical female terminal 1 remains locked, secured, and correctly positioned within the connector assembly 90. Further, when the terminal position assurance (TPA) device 300 is located substantially behind the main body 5, it may additionally prevent the electrical female terminal 1 from being removable, ejected, slidably removable or slidably ejected from the connector assembly 90, in use and in operation (see, e.g., FIG. 2C).

Figure 2D:
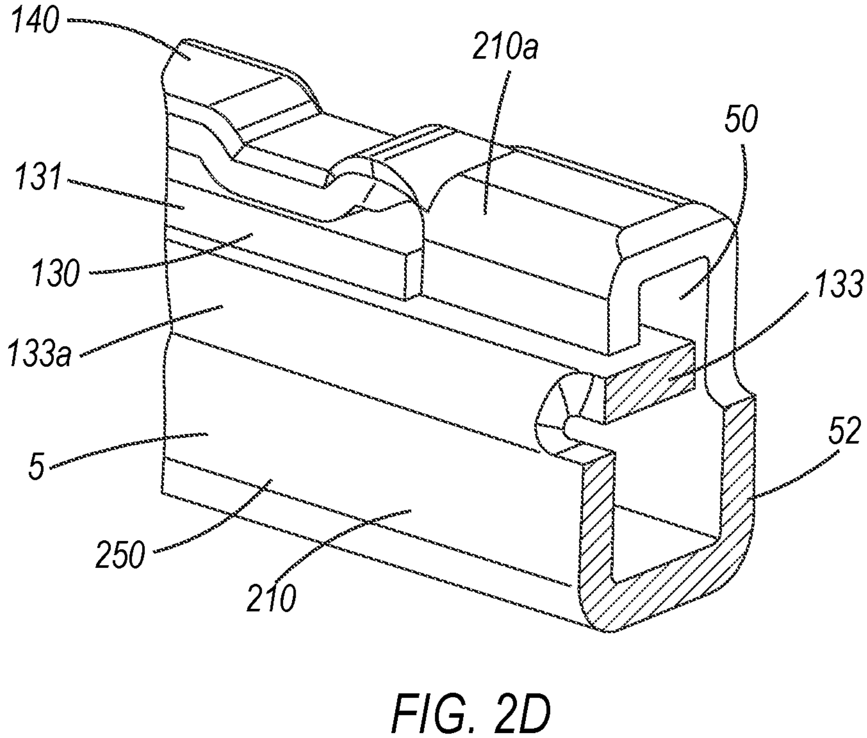
FIG. 2D is a cross-sectional view taken along the line along line 2D-2D in FIG. 8B illustrating surface area of the electrical female terminal to interfere with a terminal position assurance (TPA) device.

FIG. 2D is a cross-sectional view illustrating a surface area located on a rear portion of the lower spring member 133, of the electrical female terminal 1. Specifically, the surface area on a rear portion of the lower spring member 133 of the main body 5, may engage with the terminal position assurance (TPA) device 300. In operation, the rear portion of the lower spring member 133, provides an added interface area or interference surface for the electrical female terminal 1 for it to interact with, and or contact, and thereby interfere with the TPA device 300 when the TPA device 300 is inserted thereinto the space or transition area 50, further assuring that the electrical female terminal 1 remains locked, secured, and correctly positioned within the connector assembly 90 and preventing the electrical female terminal 1 from being removable, ejected, slidably removable or slidably ejected from the connector assembly 90, in use and in operation (see, e.g., FIG. 2C).

Figure 2E:
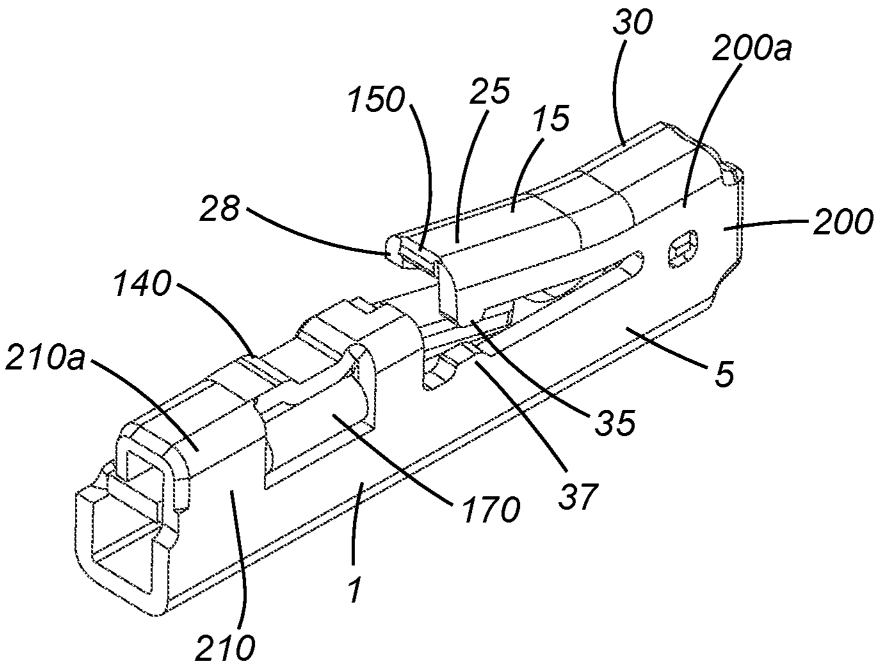
FIGS. 2E and 2F show a protrusion extending from an unattached end portion of the lever member, the protrusion having faces angled relative to each other.
Figure 2F:
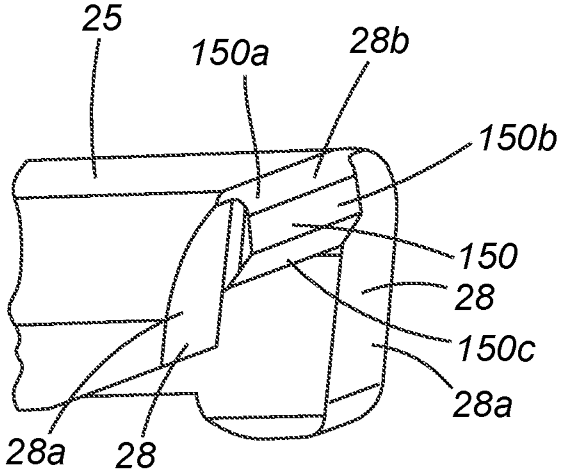

The electrical female terminal 1 of this invention further includes a protrusion 150 extending from the unattached end portion 28 of the lever member 25, as shown in FIG. 2E. As more particularly illustrated in FIG. 2F, the unattached end portion 28 of the lever member 25 preferably has side end portions 28*a* and a center end portion 28*b*. As illustrated in FIG. 2F, the protrusion 150 preferably extends from the center end portion 28*b*, although such a structural arrangement is not limited thereto. That is, the protrusion 150 is not limited to extending from the center end portion 28*b* of the end portion 28 of the lever member 25, and may also extend from the side end portion 28*a* of the end portion 28 of the lever member 25. Although not limited thereto, the protrusion 150 includes faces 150*a*, 150*b*, 150*c*, which are angled relative to each other, as shown in FIG. 2F. The relative angles among the faces 150*a*, 150*b*, 150*c* of the protrusion 150 may vary depending on the ability of the protrusion 150 to efficiently deflect the lever member 25 upwards when the protrusion 150 interacts with an internal protrusion 210 of a housing 200 or a connector assembly 90, as further discussed later with respect to FIG. 2F. Thus, the protrusion 150 makes the electrical female terminal 1 of this invention more difficult to remove from the housing 200 or the connector assembly 90, and the electrical female terminal 1 is thus protected from falling out during use.

Figure 2G:
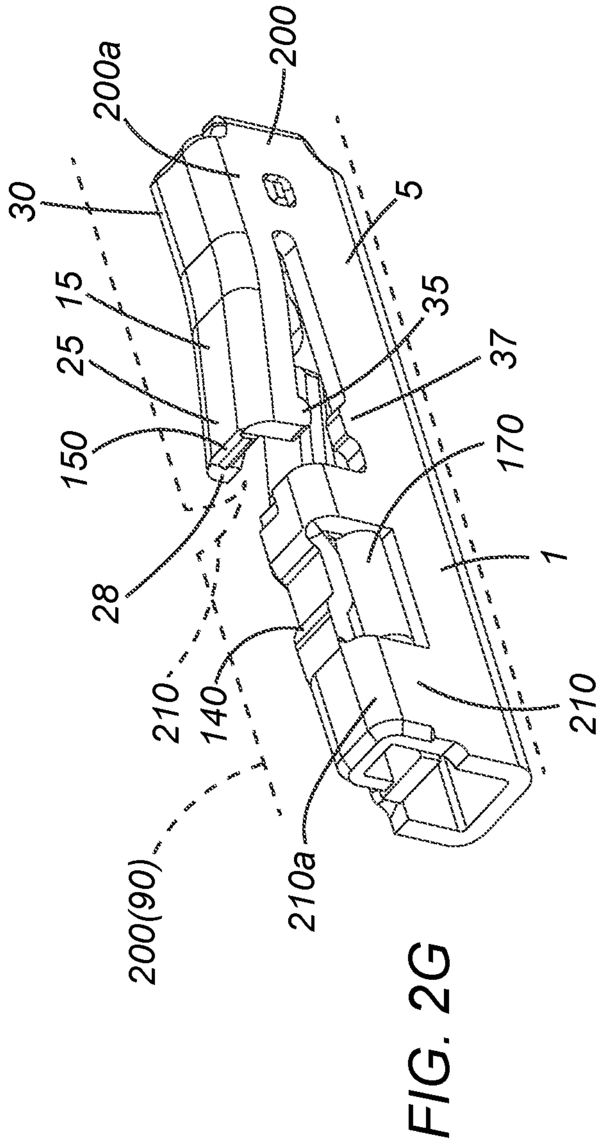
FIG. 2G illustrates the protrusion extending from the unattached end portion of the lever member for promoting the lever member to deflect upward when interacting with the internal protrusion of the housing or connector assembly, which makes it more difficult for the electrical female terminal of this invention to be removed from the housing or the connector assembly, and protects the electrical female terminal of this invention from inadvertently falling out during use.

Illustrated in FIG. 2G is the housing protrusion 210 internally extending from the housing 200 (or the connector assembly 90), which blocks the end portion 28 of the lever member 25 and consequently, blocks the electrical female terminal 1 from falling out when in use. More particularly, the protrusion 150, which extends from the unattached end portion 28 of the lever member 25, allows the protrusion 150 to effectively deflect the lever member 25 upwards when the protrusion 150 interacts with the internal protrusion 210 of the housing 200 or the connector assembly 90. Thus, the protrusion 150 makes the electrical female terminal 1 of this invention more difficult to remove from the housing 200 or the connector assembly 90, and the electrical female terminal 1 is thus protected against the electrical female terminal 1 from falling out when in use.

Figure 2H:
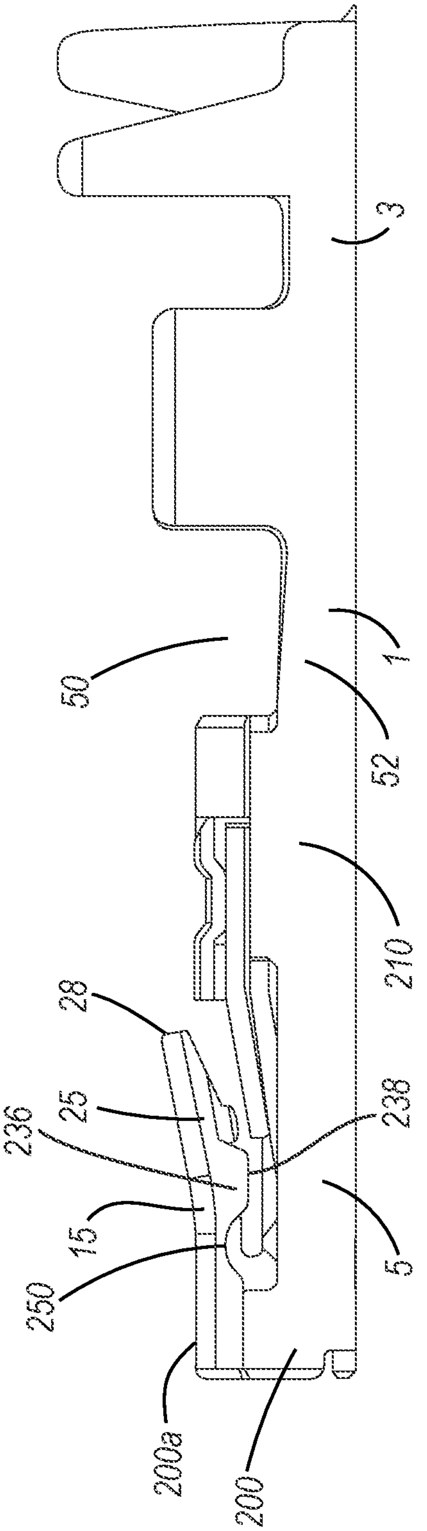
FIG. 2H is right side elevational view of the electrical female terminal of this invention showing the protruding member of the tang member of the lever member having a lower edge portion being substantially flat or extending along a substantially horizontal direction.

Also, shown in the right side elevational view in FIG. 2H of the electrical female terminal 1 of this invention, the protruding member 236 of the tang member 15 of the lever member 25 is illustrated as having a lower edge portion 238 being substantially flat or extending along a substantially horizontal direction. The lower edge portion 238 of the protruding member 236 being substantially flat or extending along a substantially horizontal direction allows for the improvement in quality control (i.e., easier to measure the structural and functional characteristics of the protruding member 236) during the manufacturing of the electrical female terminal 1. The bottom portion 250 adjacent the improved protruding member 236 is substantially shaped, as shown in FIG. 2H, to accommodate the protruding member 236 having the lower edge portion 238 substantially flat or extending at a substantially horizontal direction.

Illustrated in FIGS. 3A and 3B are the top and bottom elevational views, respectively, of the electrical female terminal 1, illustrating the main body 5 and wire fastening portion 3 which are integrally connected and formed together, substantially, in a lengthwise direction of the electrical female terminal 1.

Figure 4:
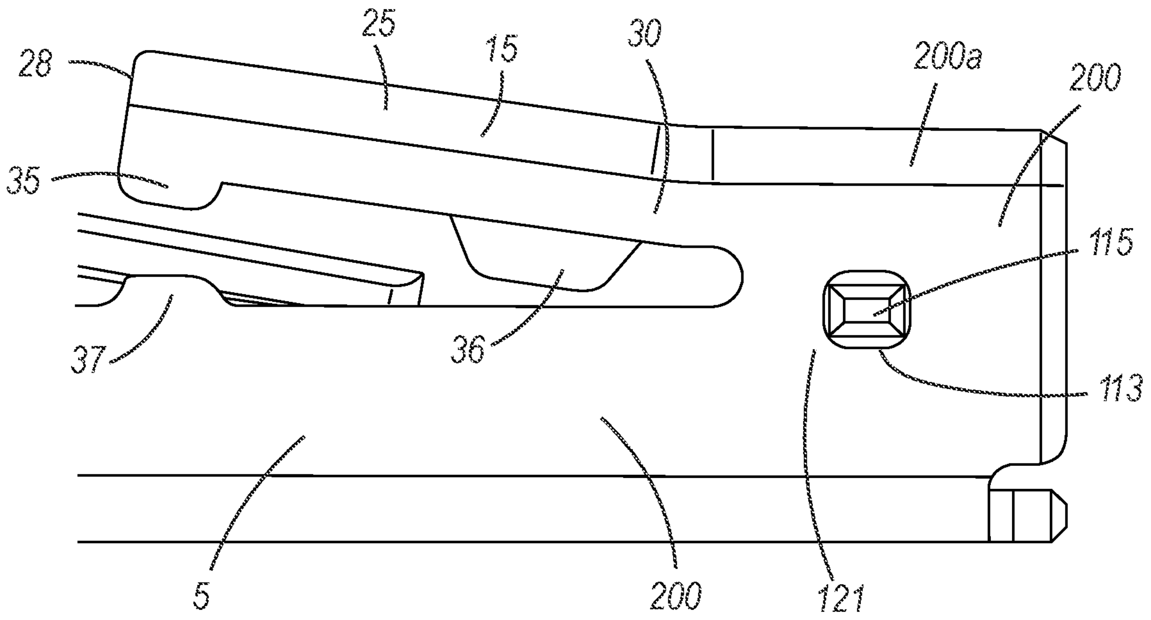
FIG. 4 is a partial side elevational view of the electrical female terminal of this invention showing protruding members respectively extending from a lever member and from the main body and the support member of the upper guide member.

Illustrated in FIG. 4 is the tang member 15 and the attached end 30 and unattached end portion 28 of the lever member 25 thereof. As previously discussed with respect to FIGS. 2A and 2B, FIG. 4 further illustrates the protruding member 35 of the unattached end portion 28 of the lever member 25, which is capable of impinging against another protruding member 37 that extends from the main body 5 (more particularly, extending from a lower portion 250 of the main body 5) in preventing the lever member 25 from being deformed when the lever member 25 is flexed. The just-described structural arrangement protects the lever member 25 from being overstressed (and thereby prevented from being deformed, over-flexed or inoperable to lock the terminal with connector assembly 90) when the lever member 25 is pushed downward toward the lower portion 250 of the main body 5 and two-bodied spring 130, upon the electrical female terminal 1 entering or slidably entering into the connector assembly 90.

Figure 8B:
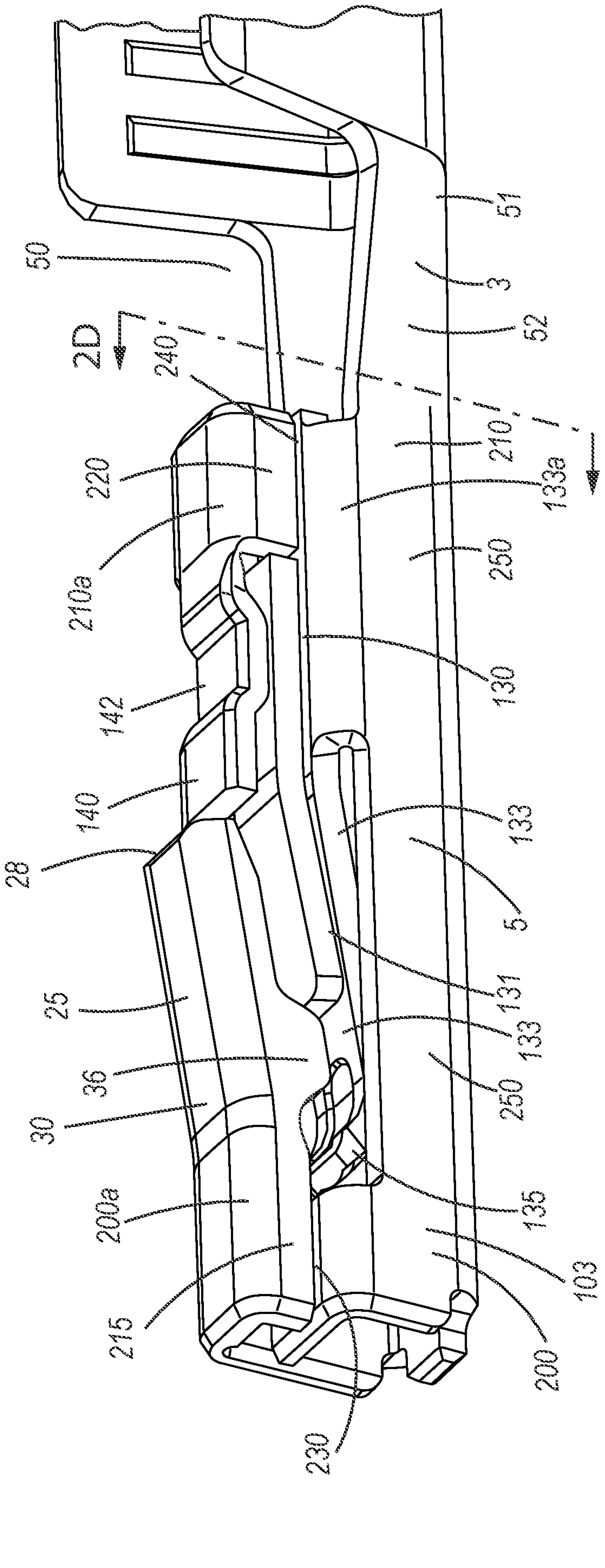
FIG. 8B illustrates, in part, another side of the electrical female terminal showing various elements of the electrical female terminal of this invention, including support members located at front and back end portions of the main body.

As further illustrated in FIG. 4, the attached end portion 30 of the lever member 25 is attached to an upper portion 200*a* of main body 5 (see also, FIG. 8B). Also shown in FIG. 4 is an aperture 113 passing through a side member 121 of the main body 5 for accommodating therein, for support, a support member 115 of an upper guide member 105, as more fully discussed below (see, e.g., FIGS. 5A, 5B).

Figure 4A:
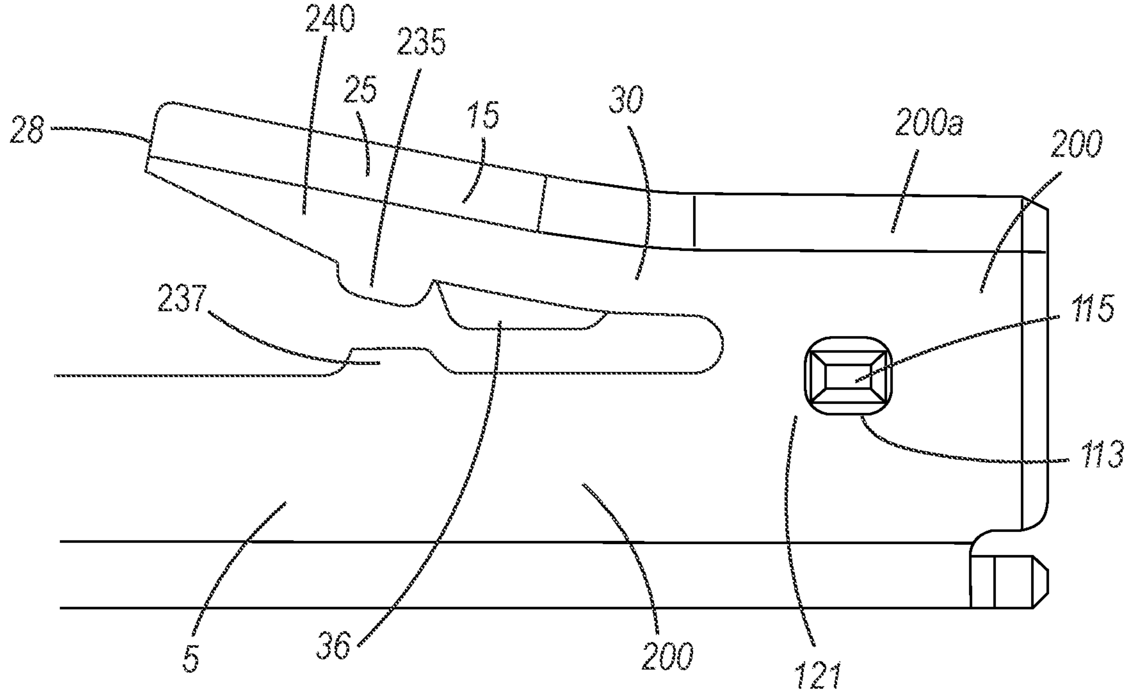
FIG. 4A is a partial side elevational view of the electrical female terminal of this invention showing an alternative overstress feature of the tang member of the lever member by having the protruding member thereof located in a substantially middle portion or in a substantially intermediate portion of the tang member.

In order to improve the overstress feature of the tang member 15 of the lever member 25 of the electrical female terminal 1 of this invention, the overstress feature, which includes a protruding member 235, is located at a substantially intermediate portion or a substantially middle portion of the tang member 15, as shown in FIG. 4A. An angled bottom portion 240 at the unattached end portion 28 of the tang member 15 of the lever member 25 is similarly shown in FIG. 4A to accommodate the protruding member 235 being located at a substantially intermediate or at a substantially middle portion of the tang member 15. Such a structural arrangement improves interaction with the tip of the tang member 15 when the electrical female terminal 1 of this invention is in use.

FIG. 4A further illustrates the protruding member 235 of the unattached end portion 28 of the lever member 25, which is capable of impinging against another protruding member 237 that extends from the main body 5 (more particularly, extending from a lower portion 250 of the main body 5) in preventing the lever member 25 from being deformed when the lever member 25 is flexed. The just-described alternative structural arrangement protects the lever member 25 from being overstressed (and thereby prevented from being deformed, over-flexed or inoperable to lock the terminal with connector assembly 90) when the lever member 25 is pushed downward toward the lower portion 250 of the main body 5 and two-bodied spring 130, upon the electrical female terminal 1 entering or slidably entering into the connector assembly 90.

Figure 5A:
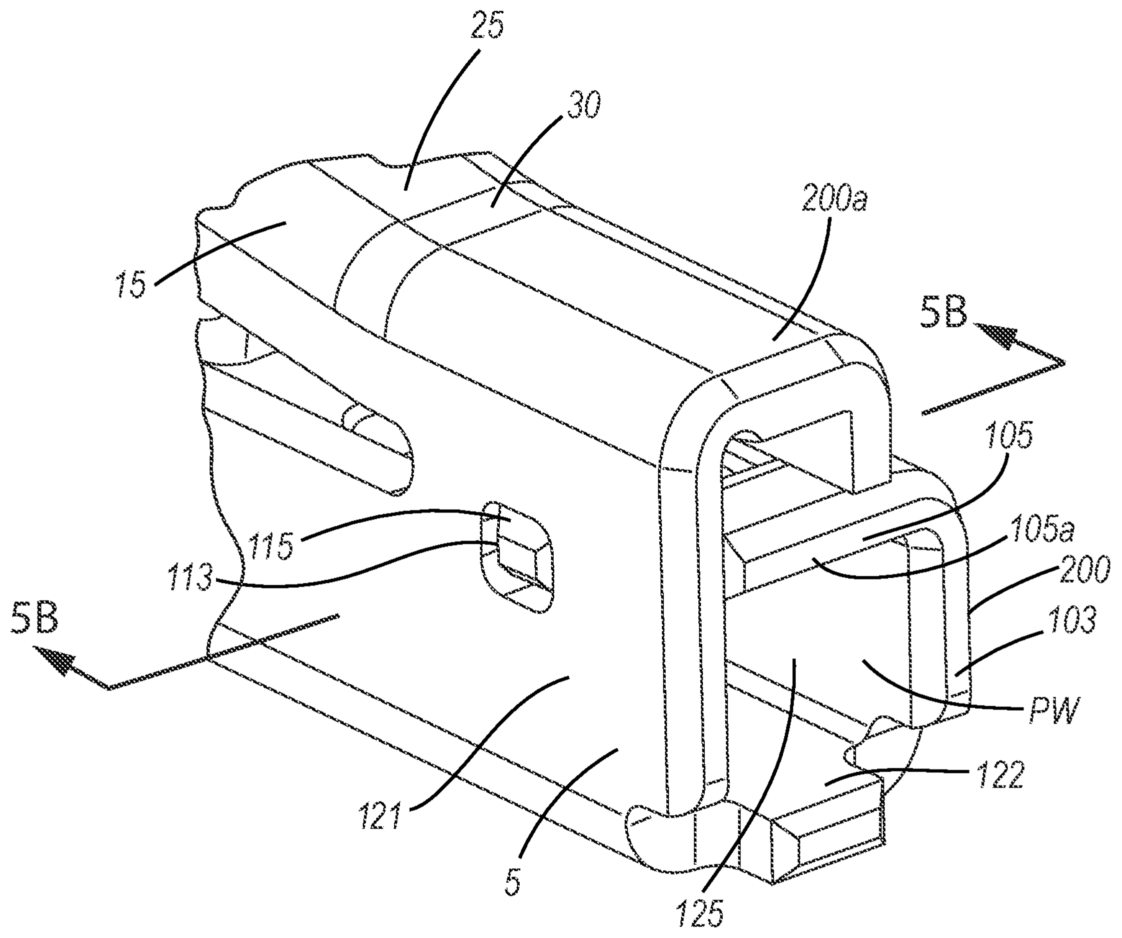
Figure 5B:
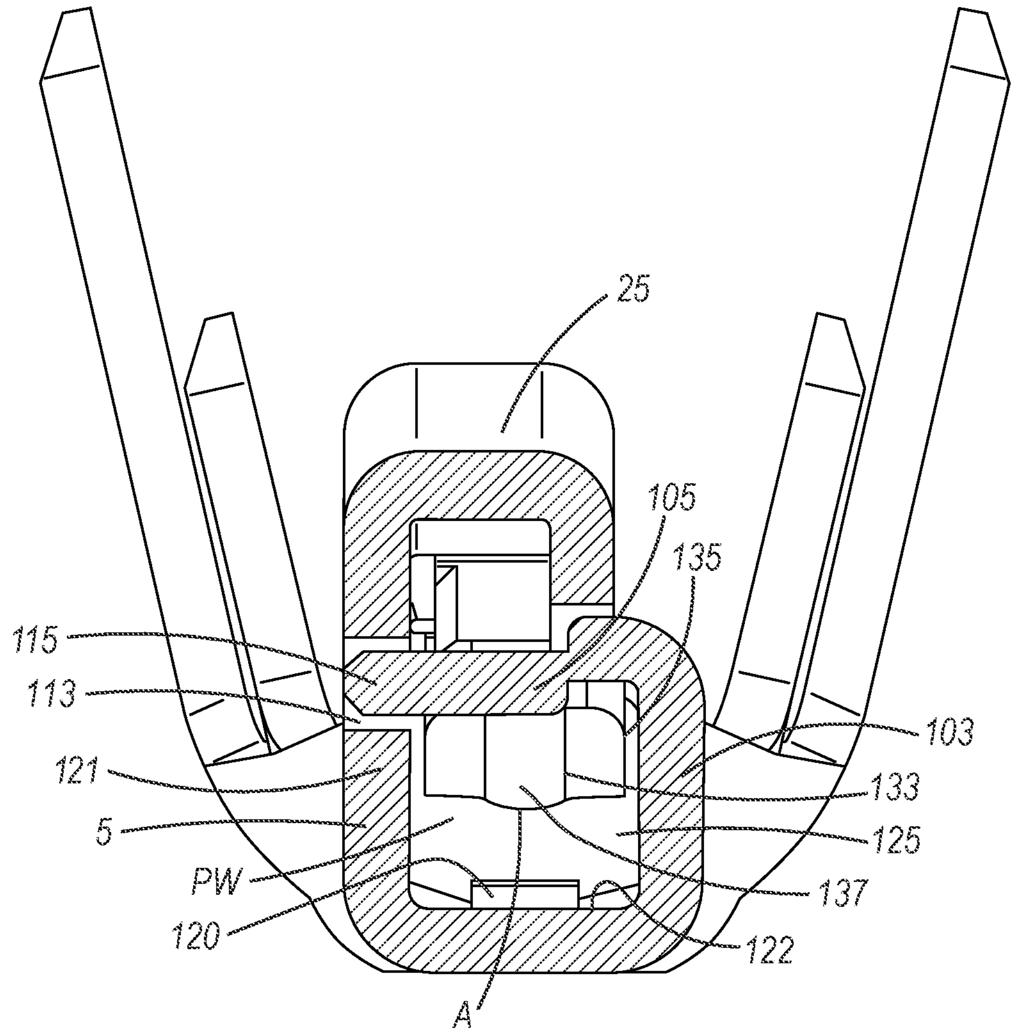
FIG. 5B is a cross-sectional view taken along line 5B-5B in FIG. 5A which illustrates the opening of the front end portion and a guide member, as well as the lower spring member having an apex on a curved portion thereof.

The front opening 125 of the main body 5 is shown in FIG. 5A. The front opening 125 is defined by the front end portion 200, having a floor 122, a side member 103, a side member 121, and the upper guide member 105. As mentioned above, side member 121 includes the aperture 113, passing through the side member 121, and for accommodating the support member 115 of the upper guide member 105. FIG. 5B is a cross-sectional view taken along line 5B-5B in FIG. 5A. As illustrated in FIGS. 5A and 5B, the aperture 113 substantially accommodates therein the support member 115. The support member 115 integrally extends from the upper guide member 105 and in a direction perpendicular to the lengthwise direction of the electrical female terminal 1. The support member 115 ensures that the upper guide member 105 remains properly oriented, and stably supported by and within the main body 5 an front opening 125. The support member 115 also prevents the deformation of the front opening 125 and stable orientation of the front end portion 200, floor 122, side member 103, side member 121, with respect to the upper guide member 105, further to ensure the shape, polarity or orientation, of the main body 5 is not disrupted by the insertion of the male pin or male terminal, or further "blade-like" object (not shown). Also shown in FIG. 5B is a substantially hump-like member 120 extending upward from the floor 122, which is further discussed in more detail below.

Further displayed in FIGS. 5A and 5B is a passageway PW which extends through the lengthwise direction of the electrical female terminal 1 and main body 5 and is defined by the front opening 125, the front end portion 200 (which defines the front opening 125 as described previously), and the space surrounded by the inner surfaces of a lower portion 250 of the main body 5. The passageway PW therefore is able to accommodate therein the male pin or male terminal, or further "blade-like" object.

Figure 5C:
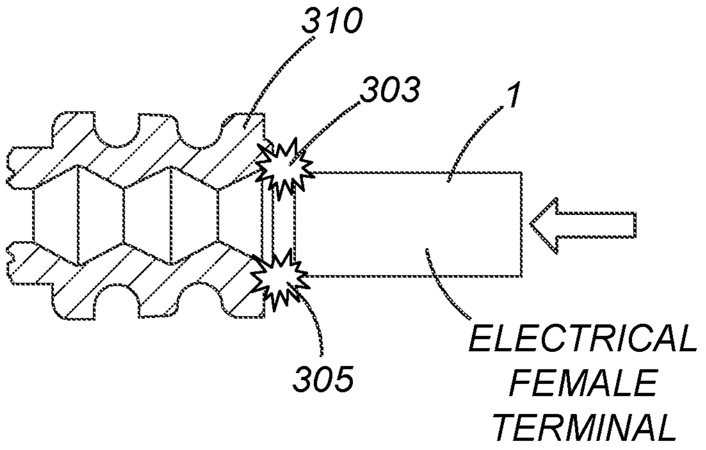
FIG. 5C is a schematic view to show the locations where a silicone seal, used for protecting the connector assembly from environmental contaminants, may become damaged during interface or mating with an electrical female terminal.
Figure 5D:
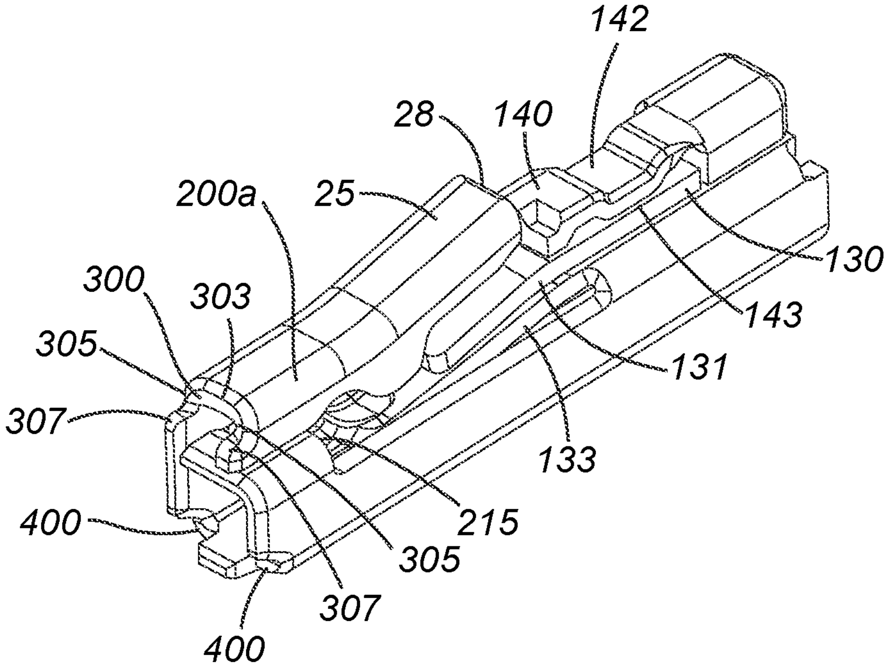
FIG. 5D shows a recessed top face portion and a recessed bottom face portion, located at a front or leading end of the electrical female terminal, for preventing any damage or cuts to the silicone seal during interface or mating therewith.

A connector system is sealed from environmental contaminants by utilizing silicone seals 310. During installation, the electrical female terminal 1 of this invention must pass through a silicone seal 310, as shown in the schematic view of FIG. 5C; and during this process, the silicone seal 310 becomes vulnerable to damage or cuts at locations 303, 305 of the silicone seal 310. So as to avoid the terminal face or leading end portion of the electrical female terminal 1 from damaging or cutting the silicone seal 310 during mating therewith, a recessed top face portion 300 and a recessed bottom face portion 400 are provided, as illustrated in FIG. 5D. This is achieved by having the recessed top face portion 300 and the recessed bottom face portion 400 spread out the interference between the electrical female terminal 1 of this invention and the silicone seal 310 at a larger distance, along the length of the recessed top face portion 300 or the recessed bottom face portion 400. With respect to the recessed top face portion 300, for example, the recessed top face portion 300 includes top 303, side 305, and bottom 307 portions, as illustrated in FIG. 5E and as more fully discussed below.

Figure 5E:
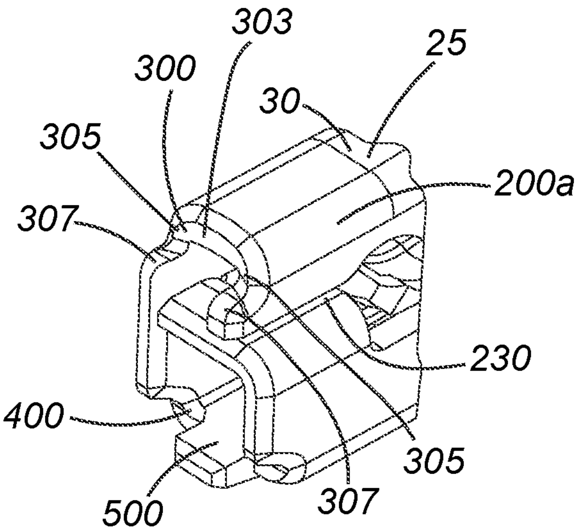
FIG. 5E is a perspective view of a recessed top face portion at the front or leading end of the electrical female terminal for preventing any damage or cuts to the silicone seal, which protects the electrical female terminal from environmental contaminants, during mating between the electrical female terminal and the silicone seal by spreading out the interference between the electrical female terminal and the silicone seal along the length of the recessed top face portion.

As more fully illustrated in FIG. 5E, the recessed top face portion 300 includes a top portion 303, side portions 305, and a bottom portion 307 located at the front ends or leading portions of the first support member 215 and the upper portion 200*a*. Although the recessed top face portion 300 may take the shape or form as illustrated in FIGS. 5D and 5E, the shape or form of the recessed top face portion 300 is not limited thereto, and may take any desired shape or form with the objective of preventing any damage or cutting of the silicone seal 310 during mating therewith.

Figure 5F:
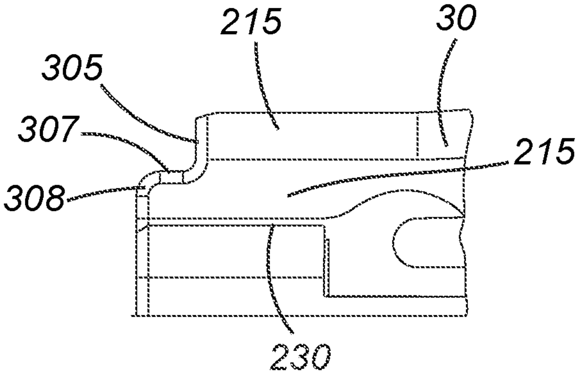
FIG. 5F shows the recessed top face portion having a flat surface recess.
Figure 5G:
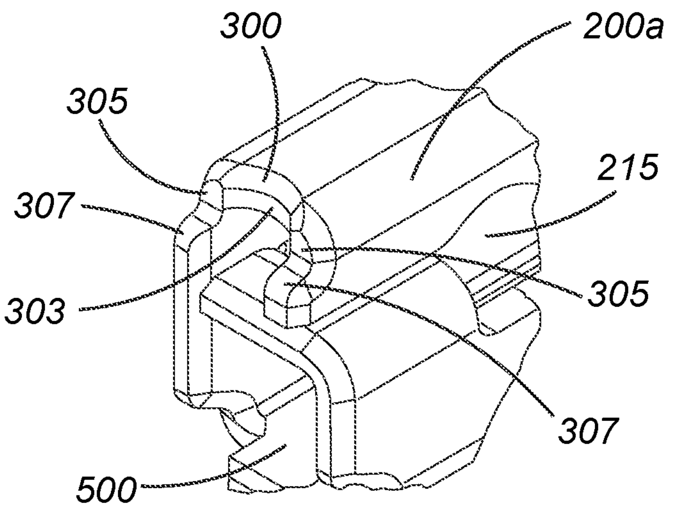
FIGS. 5G and 5H show the recessed top face portion having a concave surface recess.
Figure 5H:
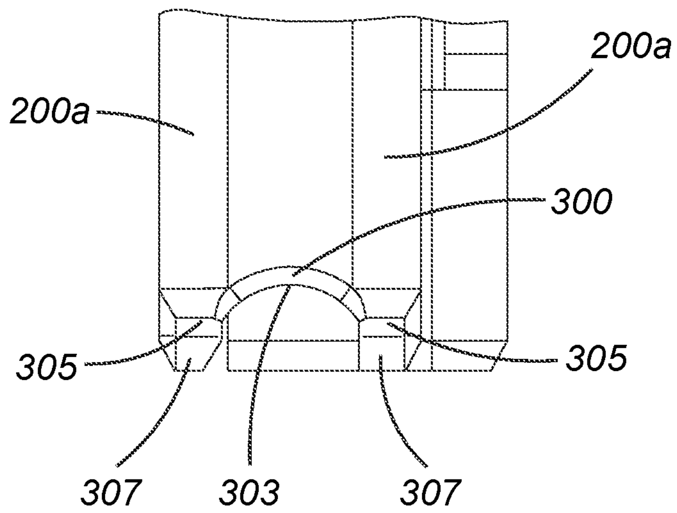

For example, the shape or form of the recessed top face portion 300 may be a flat surface recess, as illustrated in FIG. 5F, or may be a concave surface recess, as illustrated in FIGS. 5G and 5H. As shown in the top view of FIG. 5H, the top portion 303 is shown to curve in a concave form or shape.

As noted above, however, the recessed top face portion 300 may take any shape or form with the objective of preventing damage or cuts in the silicone seal 310 during interface or mating therewith. The recessed top face portion 300 may thus also take the shape or form of a convex protrusion (not shown).

Figure 5I:
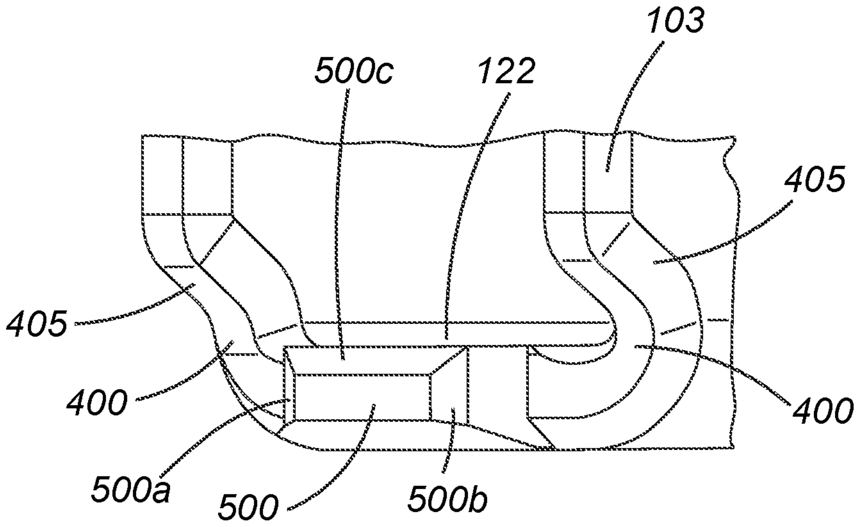
FIG. 5I shows a recessed bottom face portion at the leading or front end of the electrical female terminal for similarly alleviating damage to the silicone seal during interface or mating therewith by spreading out the interference between the electrical female terminal and the silicone seal along the length of the recessed bottom face portion.

The bottom portion of the leading or front end of the electrical female terminal 1 of this invention includes the recessed bottom face portion 400, which can also have alternative shapes or forms with a similar objective of preventing damage or cuts to the silicone seal 310 during interface or mating therewith. The recessed bottom face portion 400 alleviates damage to the silicone seal 310, during interface or mating therewith, by spreading out the interference between the electrical female terminal 1 and the silicone seal 310 along the length of the recessed bottom face portion 400. As shown in, for example, FIG. 5I, the recessed bottom face portion 400 includes top portions 405 extending downward towards a middle extending member 500, which in turn extends from the floor 122 inside the front end portion 200 of the main body 5. The middle extending member 500 has side portions 500*a*, 500*b*, and a top portion 500*c*. As with the recessed top face portion 300, the recessed bottom face portion 400 has for its objective to spread out the interference between the electrical female terminal 1 and the silicone seal 310 along the length of the recessed bottom face portion 400 to thereby prevent any damage or cuts to the silicone seal 310 during interface or mating therewith.

Figure 6A:
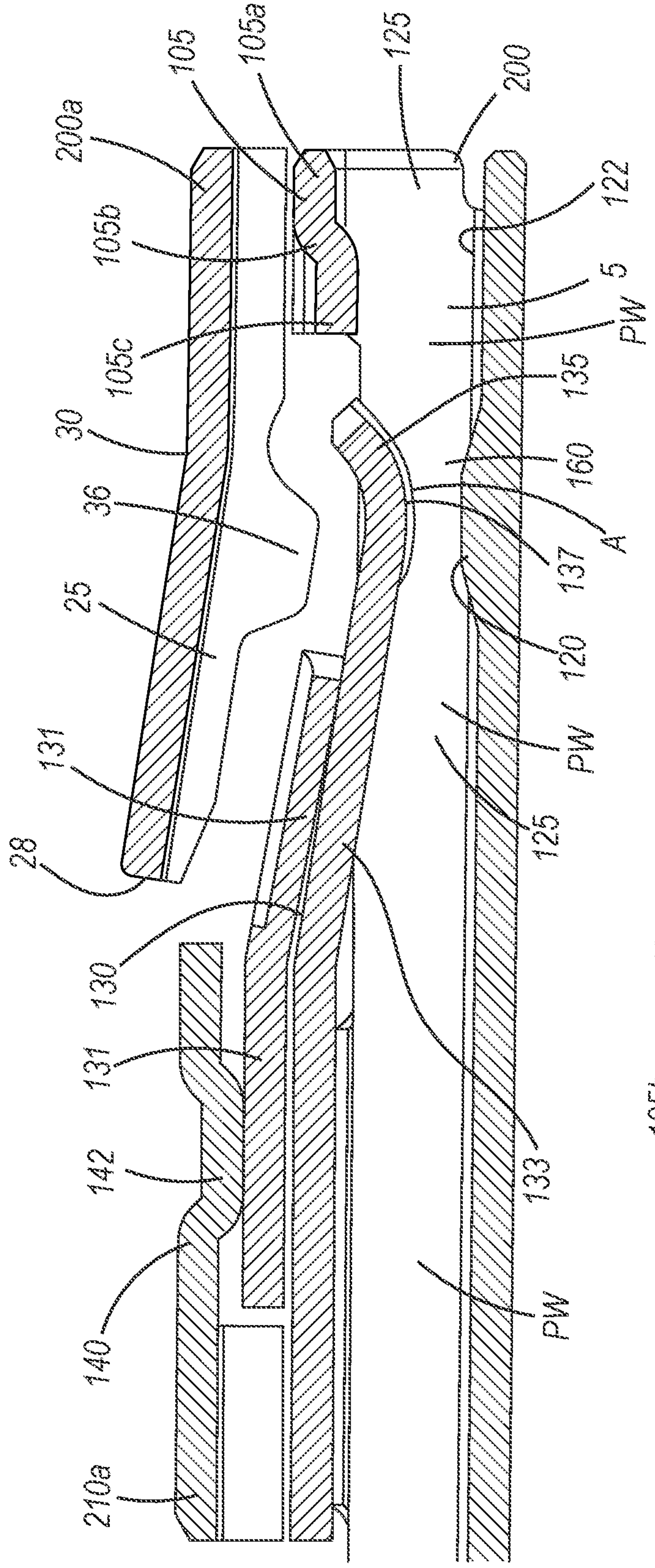
Figure 6B:
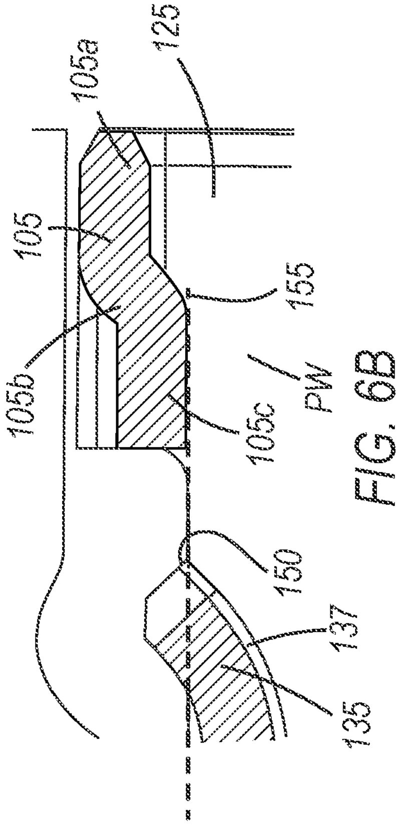
FIG. 6B is a schematic illustration of the guide member located near the opening of the front end portion of the electrical female terminal.

The relationship between the substantially hump-like member 120 and the two-bodied spring 130 is illustrated in FIG. 6A, which is a cross-sectional view taken along line 6A-6A in FIG. 1B. Further illustrated in FIG. 6A, is the upper guide member 105 of the front end portion 200 of the main body 5. The upper guide member 105 is comprised of a first substantially level portion 105*a*, a substantially inclined portion 105*b*, and a second substantially level portion 105*c*. The aforementioned portions of the upper guide member 105 comprise and act as a guiding feature, to direct, orient and or "self-correct" the male pin or male terminal, or further "blade-like" object into the front opening 125 and passageway PW of the electrical female terminal 1. More specifically, the lower surface of the upper guide member 105 extends substantially along and defines the upper portion of the passageway PW, from the front opening 125 of the main body 5, toward the two-bodied spring 130 of the electrical female terminal 1, in the respective lengthwise direction of the electrical female terminal 1 (see FIGS. 5A, 5B, 6A). From the front opening 125, the first substantially level portion 105*a* extends and defines the upper surface of the front opening 125 and front portion of passageway PW, the second substantially inclined portion 105*b* further defines the passageway PW, and similarly, the third substantially level portion 105*c* defines the passageway PW, respectively, as illustrated in FIGS. 6A and 6B. More specifically, the upper guide member 105 directs, orients and or "self-corrects" a male pin or male terminal, or further "blade-like" object (not shown) in a lengthwise direction through the passageway PW, by guiding the male pin or male terminal, or further "blade-like" object at the front opening 125 from the front end portion 200 of the main body 5, further guiding the object towards the two-bodied spring 130, and\or further guiding the object towards the substantially hump-like member 120 extending from the floor 122 and the respective lower spring member 133, and toward\into a space 160. The male pin or male terminal, or further "blade-like" object (not shown) here described, is inserted by entering or slidably entering into the electrical female terminal 1 into the passageway PW. As the male pin or male terminal, or further "blade-like" object (not shown) is further inserted into the passageway PW in a lengthwise direction, it is secured or impinged and fastened between the two-bodied spring 130 and the substantially hump-like member 120 and into the space 160, and further acted upon by the spring force of the two-bodied spring 130. As the male pin or male terminal, or further "blade-like" object (not shown) continues entering or slidably entering further into the passageway PW, it may lose contact with the upper guide member 105, as the male pin or male terminal, or further "blade-like" object becomes oriented in a substantially level or perpendicular orientation to\with the topmost surface of the substantially hump-like member 120. More specifically, the male pin or male terminal, or further "blade-like" object (not shown) may lose contact with the first substantially level portion 105*a*, a second substantially inclined portion 105*b* respectively (and depending on the size of the male pin or male terminal or further "blade-like" object, it may lose contact with the third substantially level portion 105*c*) as the male pin or male terminal, or further "blade-like" object becomes oriented in a substantially level or perpendicular orientation to\with the topmost surface of the substantially hump-like member 120. Further, if the male pin or male terminal, or further "blade-like" object (not shown) is inserted in an angled orientation with respect to the lengthwise direction of the pin, it is preferable that an end or tip of such object will not enter into the distance or the space formed between the third substantially level portion 105*c* and the two-bodied spring 130. Additionally, the male pin or male terminal, or further "blade-like" object (not shown) may be further oriented during its initial insertion into the electrical female terminal 1, wherein the end or tip of the male pin or male terminal, or further "blade-like" object may contact or may not contact the lower surface of the upper guide member 105 when within the passageway PW.

The two-bodied spring 130, as shown in FIG. 6A, has an upper spring member 131 and the lower spring member 133. The two-bodied spring 130 extends substantially from a back end portion 210 of the main body 5 towards the front end portion 200 of the main body 5 and in a lengthwise direction along electrical female terminal 1. As in FIG. 6A, the lower spring member 133 extends longer and or further in the lengthwise direction than the upper spring member 131, and reaches further towards the front end portion 200 of the main body 5 and above the substantially hump-like member 120, as well.

As illustrated in FIG. 6A, the upper spring member 131 extends partially along and above the lower spring member 133. As further seen in FIG. 6A, the upper spring member 131 may contact the lower spring member 133 at a point located on the lower spring member 133 thereof which is substantially toward the front end portion 200 of the main body, and more specifically at a point located before the portion of lower spring member 133 above the substantial hump-like member 120. Further, an inclined portion of the upper spring member 131 extends and is substantially inclined and toward the floor 122 of the main body 5. In an unflexed position, this substantially inclined portion of the upper spring member 131 does not substantially contact the lower spring member 133 except for, preferably in full or in part, at a single point, and less preferably the substantially inclined portion of the upper spring member 131 may not contact the lower spring member 133 at all. Further, in a flexed position the upper spring member 131 can be in contact with, and be slidably contacted with, in full or in part, against a similarly flexed lower spring member 133 while providing a spring force, therewith, the spring force of the lower spring member 133, resulting in the a combined spring force of both the lower and upper spring members respectively and thereby provided by the two-bodied spring 130 in its entirety (as shown in FIGS. 6A, 8B).

As further evidence of the structural or function relationship discussed above, when the lower spring member 133 and upper spring members 131 are in contact in an unflexed state, the initial spring force will be evident as that of both the upper and lower spring members 131, 133 by both applying their respective spring forces in unison or together, and or in total, and acting upon the male pin or male terminal, or further "blade-like" object (not shown) inserted into the electrical female terminal 1. In contrast, when the upper and lower spring members 131, 133 do not contact in their respective unflexed states, the initial applied spring force will be evident solely as that of the lower spring member 133 spring force, as it flexes, until the lower spring member 133 makes initial contact or contacts with the upper spring member 131, whereby the upper spring member 131 will apply a spring force against the lower spring member 133 and in unison or together and or in total against the male pin or male terminal, or further "blade-like" object.

As further seen in FIG. 6A, a portion of the lower spring member 133, while in a normally relaxed and unflexed state, is substantially inclined downward toward the floor 122 of the main body 5, and into the lower portion 250 of the main body 5 and into the passageway PW. A portion of the lower spring member 133, within the passageway PW, is movable substantially unobstructed in an upward direction away from the floor 122. Another portion of the lower spring member 133 is obstructed by, and except for, a concurrent movement upward with and against the upper spring member 131, as the result of the lower spring member 133 contacting the upper spring member 131. More specifically, when the male pin or male terminal (not shown) is inserted into the passageway PW, the two-bodied spring 130 will move from its normal, relaxed state and into a flexed state, and the substantially unobstructed portion of the lower spring member 133 may additionally substantially exit the passageway PW. Thus, the two-bodied spring 130 asserts its spring force against and or acting upon the male pin or male terminal or further "blade-like" object, in the direction of a return to its normal, unflexed state. The two-bodied spring 130, at the substantially unobstructed portion of lower spring member 133, will move further upward, away from the floor 122, and towards the lever member 25. Thus, the two-bodied spring 130 may continue to be movable substantially unobstructed until its travel is limited by the lower spring member 133, as the two-bodied spring 130 contacts the protruding member 36 of the lever member 25. Additionally, the lever member 25 may be static or immobile or prevented from moving in the direction away from the floor 122 (e.g. by potential contact with the connector assembly 90), whereby the protruding member 36 provides an overstress protection for the lower spring member 133, and thus the two-bodied spring 130. In operation, and or when the electrical female terminal 1 resides in the connector assembly 90, the lever member 25 is preferably in a normal, unflexed state wherein the lower spring member 133 commences to interact with the male pin or male terminal (not shown), thereby providing for the greatest distance of substantially unobstructed travel of the two-bodied spring 130 in an upward direction, away from the floor 122, to accommodate fully the size of the male pin or male terminal (not shown) and prevent the two-bodied spring 130 from contact with the lever member 25. In the situation where the lever member 25 is further movable away from the floor 122, and not static or not immobile or prevented from moving in the direction away from the floor 122 (e.g. contact with the connector assembly 90), the lever member 25 is further movable upward and away from its normal, unflexed state. Thus if the two-bodied spring 130 contacts the lever member 25 when it is in the aforementioned position, the resulting contact of the end portion 135 of lower spring member 133 with a portion of the protruding member 36 or lever member 25 results in the resilient force of the lever member 25, as it flexes away from its normal, relaxed state and away from the floor 122, to be applied and added in addition to the spring force of the two-bodied spring 130. Specifically, the lever member 25 thereby adds onto the spring force of the lower spring member 133 as it makes contact with the lever member 25, in full or in part, and thus generally the two-bodied spring 130. More specifically, in the aforementioned situation, the resilient force applied by the lever member 25, in the direction of return to its normal, relaxed state, is in a direction opposite the movement of the end portion 135 of lower spring member 133 when making contact with the lever member 25 and or protruding member 36, and thereby, increases the spring force of the two-bodied spring 130 in a downward direction towards the floor 122, or the male pin or male terminal or further "blade-like" object under the two-bodied spring 130, and even more specifically directed to an apex A of the two-bodied spring 130, as will be discussed below.

As further illustrated in FIG. 6A, an end portion 135 of the lower spring member 133 includes a substantially curved portion 137 that curves to an apex A, and is directed downward toward the substantially hump-like member 120 (see FIG. 5B). The male pin or male terminal (not shown) upon entering through the front opening 125 and into passageway PW, will become secured or impinged between the substantially curved portion 137 and the substantially hump-like member 120 and within the space 160. The space 160 accommodating the male pin or male terminal (not shown) is defined by the distance between the substantially curved portion 137, and the topmost surface of the hump-like member 120 substantially parallel to the floor 122 of the lower portion 250 of the main body 5. The space 160 becomes enlarged or expansive wherein the two-bodied spring 130 moves in an upward direction, away from the floor 122, while further interacting with the male pin or male terminal (not shown). As the two-bodied spring 130 moves in an upward direction, away from the floor 122, and this increases the distance between the substantially curved portion 137, and the topmost surface of the hump-like member 120, and thus increases the space 160. The substantially curved portion 137, at its apex A, provides preferably for a single point of contact between the two-body spring 130 and an inserted male pin or male terminal (not shown), within space 160. The apex A of the substantially curved portion 137, allows for the spring force of the two-bodied spring 130 to be located, directed, and substantially fixated at a point above, central, and centered over the substantially hump-like member 120, and onto and act upon a respective male pin or male terminal as it is inserted or resides in space 160.

As also shown in FIG. 6A and located above the upper spring member 131 is a top retainer member 140. The ends of the top retainer member 140 are substantially connected to the main body 5 at two points, (one end connected to the side member 121 of the main body 5 and one at the upper main body 210*a* at the back end portion 210) (see, FIGS. 6A, 8A and 8B). Top retainer member 140 has a portion substantially U-shaped, as the bottom part 142 thereof, which contacts and abuts, in part, the upper spring member 131 (also see, FIGS. 8A, 8B). As seen in FIG. 6A, the top retainer member 140 provides a substantially rigid and resilient surface abutting the upper spring member 131 and ensures the folded construction of the two-bodied spring 130 is maintained and contact between the upper spring member 131 and lower spring member 133 is maintained. As in FIGS. 7, 8A, the top retainer member 140 prevents and maintains the upper spring member 131 from being unfurled, unfolded, substantially separated, or deformed from a level, and preferably substantially parallel orientation with the lower spring member 133 above the lower portion 250 of the main body 5. The upper spring member 131 and lower spring member 133 may be oriented whereby they contact in full or in part. Additionally, the top retainer member 140 maintains the folded construction of the two-bodied spring 130 by preventing the upper spring member 131 and lower spring member 133 from being unfurled, unfolded, substantially separated, or deformed as the two-bodied spring 130 is in a normal, unflexed state, or is in a flexed state wherein spring force is exerted against a male pin or male terminal (not shown).

As illustrated in the schematic diagram in FIG. 6B, the front end tip 150, of the end portion 135 of the lower spring member 133, is to be in line or above the lower surface 155 of the second level portion 105*c* of the upper guide member 105. This orientation ensures the male pin or male terminal (not shown) passing through the front opening 125 is effectively guided by the upper guide member 105 and the end portion 135 of the lower spring member 133, along the substantially curved portion 137, and passes through a space 160 between the curved portion 137 of the lower spring 133 and the substantially hump-like member 120 (see also, FIG. 6A). Additionally, the front end tip 150 of the end portion 135 of the lower spring member 133 is to be in line or above the lower surface 155 of the second level portion 105*c* of the upper guide member 105 so as to prevent the lower spring member 133 from being impinged or oriented whereby unfavorably the male pin or male terminal passes between the lower surface 155 of the second level portion 105*c* and the end portion 135 of the lower spring member 133, and or into the gap or space created there between the aforementioned portions when the male pin or male terminal is inserted in an angled orientation with respect to a lengthwise direction of the electrical female terminal 1.

Figure 7:
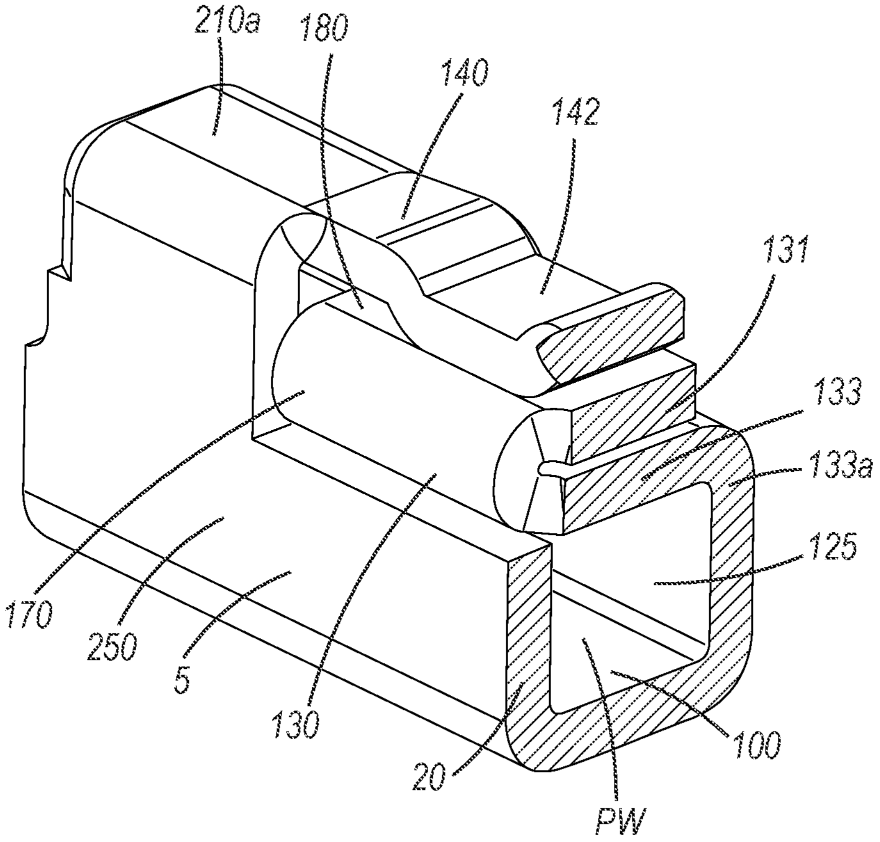
FIG. 7 shows the two-bodied spring and further shows a top retainer member mounted onto the spring.

As illustrated in FIG. 7, the upper spring member 131 and the lower spring member 133 of the two-bodied spring 130 are integrally structured with each other and connected by curved side members 170, 133*a*, and folded one above the other, with the upper spring member 131 being above the lower spring member 133 respectively. Under the top retainer member 140, the two-bodied spring 130 is preferably substantially parallel in a lengthwise direction of electrical female terminal 1 to the floor 122 (also see, FIG. 6A). The upper spring member 131 and lower spring member 133 may also be oriented whereby they contact in full or in part along the lengthwise direction of the electrical female terminal 1 to the floor 122. As further shown in FIG. 7, the upper and lower spring members 131, 133 are integrally connected by the curved side member 170 of the two-body spring member 130 (also see FIG. 8A). The curved side member 170 is accommodated, at least in part, within a window or opening 180 of the main body 5. Also illustrated in FIG. 7 is the curved side portion 133*a* of the main body 5, which integrally connects the lower spring member 133 to the lower portion 250 of the main body 5 (also see, FIG. 8B). The curved side member 170 and curved side portion 133*a* may further influence and allow the resultant spring force of the two-bodied spring 130 to be further dependent or optimized upon the aspects of thickness, length, or radius of curvature etc. of the curved side member 170 and or curved side portion 133*a*, both respectively.

As previously described, a portion of the lower spring member 133 is movable unobstructed in an upward direction, away from the floor 122, until a portion of the lower spring member 133 contacts protruding member 36 of the lever member 25. Preferably, the two-bodied spring 130 will be initially flexed in the upward direction and away from the floor 122, by a male pin or male terminal (not shown), and initially and preferably occurring when the lever member 25 is in a normal unflexed orientation to allow the lower spring member 133 the greatest distance of travel between the floor 122 and the protruding member 36. The lower spring member 133 has the end portion 135 which is a portion of the lower spring member 133 projected upward or inclined towards the upper main body 200*a* and lever member 25. The upward movement away from the floor 122 of the lower spring member 133 and end portion 135, will ultimately lead to, and result with the end portion 135 thereof reaching substantially near or touch/contact the protruding member 36 of lever member 25, and thereby limit the upward travel of the two-bodied spring 130 where the lever member 25 is static or immobile or prevented from moving in the direction away from the floor 122. In the previous instance, a resulting contact of the end portion 135 of lower spring member 133 with a portion of the protruding member 36, will prevent the end portion 135, and consequently, the lower spring member 133 and upper spring member 131 from being further moveable, overstressed or substantially deformed upward when the female terminal 1 is mating with a male pin or male terminal (not shown). Thus, this prevents the overstress or substantial deformation of the two-body spring 130 and the two-body spring 130 may return to an unflexed state if or when a male pin or male terminal is further then removed from the electrical female terminal 1. Further, and as previously mentioned, in the situation wherein the lever member 25 is further movable away from the floor 122, and not static or not immobile, and is instead mobile, and unimpeded, the lever member 25 is further movable upward and away from the floor 122, and or concurrently with the two-bodied spring 130. It is then further possible, where the resulting contact of the end portion 135 of lower spring member 133 with a portion of the protruding member 36, results in a resilient force applied to the lower spring member 133 by the lever member 25. The resilient force applied by the lever member 25 against the end portion 135 of lower spring member 133 therefore adds onto the spring force of the two-bodied spring 130.

Illustrated in FIG. 8B are both the front and the back end portions 200, 210 of the main body 5, having a first support member 215 and a second support member 220, respectively. More particularly, an upper portion 200*a* at a front end portion 200 of the main body 5 includes the first support member 215, while the upper portion 210*a* at the back end portion 210 of the main body 5 includes the second support member 220. A gap 230 may separate the first support member 215 from a lower portion 250 of the main body 5. A gap 240 may separate the second support member 220 from the lower portion 250 of the main body 5. When the electrical female terminal 1 enters the connector assembly 90, the first support member 215 and the second support member 220 are resiliently pushed downward toward, and may substantially contact, the lower portion 250 of the main body 5 through the gaps 230, 240, respectively, which may eliminate the gaps 230, 240. On the other hand, the gaps 230, 240 may not exist before the electrical female terminal 1 enters the connector assembly 90, wherein the first support member 215 and second support member 220 are fully contacting the lower portion 250 of the main body 5. With the above-described structural arrangements, the first and second support members 215, 220 provide structural resilience and rigidity to the main body 5, providing a support for the upper portions 200*a*, 210*a* of the main body by providing an available interface surface thereof facing the lower portion 250 of the main body 5. Therein, the first and second support members 215, 220 prevent the electrical female terminal 1 of this invention from being overstressed or deformed and as well as when being fitted into the connector assembly 90 and in use (see FIGS. 10A, 10B).

Figure 8C:
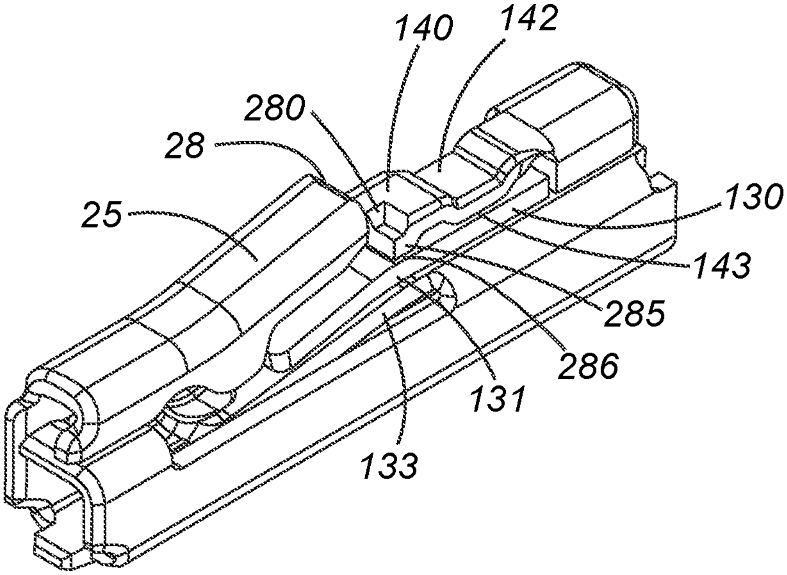
FIG. 8C shows an alternative embodiment of the electrical female terminal of this invention showing a top portion of the retainer member, located above the two-bodied spring, having a dimple portion to increase the number of contacts to an upper spring of the two-bodied spring, so as to increase the stiffness of the two-bodied spring.
Figure 8D:
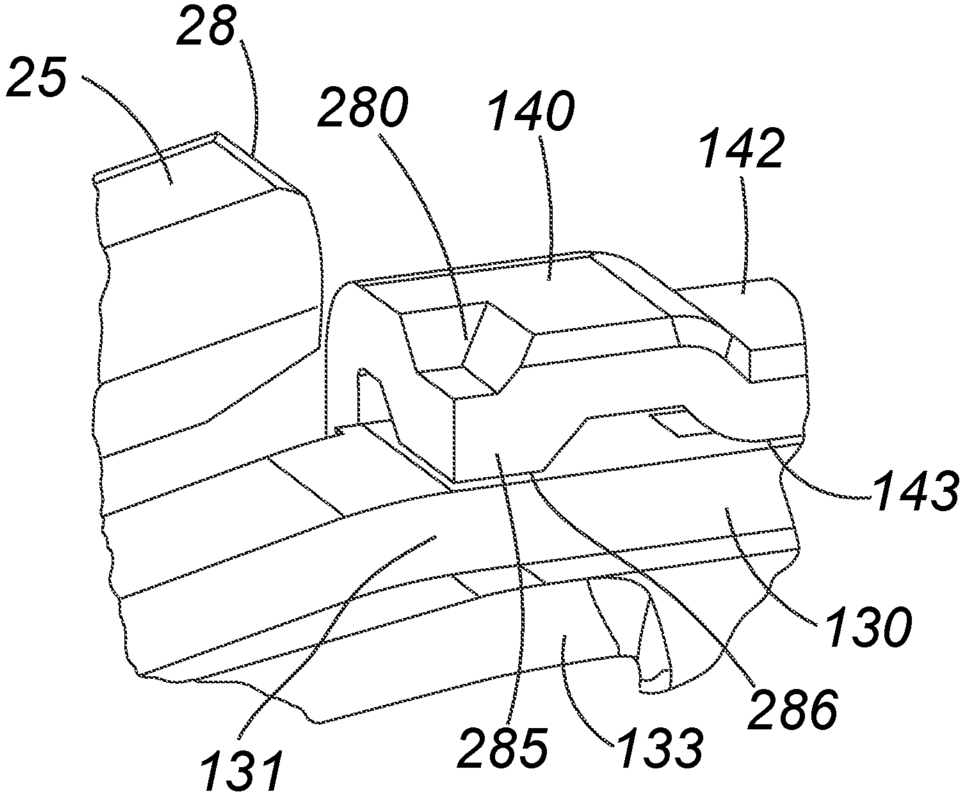
FIGS. 8D, 8E, and 8F further illustrate alternative embodiments of the dimple portion on the top portion of the retainer member above the two-bodied spring.

FIG. 8C shows an alternative embodiment of the electrical female terminal 1 of this invention having the top retainer member 140, which is adjacent to the retainer member 142 and located above the two-bodied spring 130, with a dimple portion 280 to increase the number of contacts to the upper spring 131 of the two-bodied spring 130, so as to increase the stiffness of the two-bodied spring 130. That is, the first contact 143 with the upper spring member 131 is provided beneath the retainer member 142, while the second contact 286 with the upper spring member 131 is provided beneath an extended lower portion 285 beneath the dimple portion 280. As more particularly illustrated in FIG. 8D, beneath the dimple portion 280 is the extended lower portion 285, the extended lower portion 285 being in direct contact with the upper spring member 131 of the two-body spring 130 and providing the second contact 286 with the upper spring member 131. Also shown in FIG. 8D is the dimple portion 280 in a substantially angled cup-like shape, although the shape of the dimple portion 280 may take any form or shape, as shown (and not limited thereto) in FIGS. 8E and 8F, as alternative embodiments of the dimple portion 281.

Figure 8E:
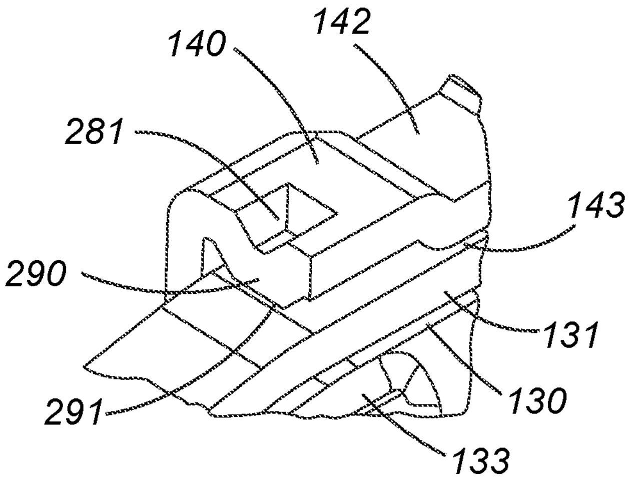

For example, as shown in FIG. 8E, the dimple portion 281 may take a substantially V-shaped form. Further shown in FIG. 8E, the first contact 143 with the upper spring member 131 is provided beneath the retainer member 142, while the second contact 291 with the upper spring member 131 is provided beneath an extended lower portion 290 beneath the dimple portion 281. That is, as more particularly illustrated in FIG. 8E, beneath the dimple portion 281 is the extended lower portion 291, which directly contacts the upper spring member 131 of the two-body spring 130 and provides the second contact 291 with the upper spring member 131, thereby advantageously increasing the stiffness of the two-bodied spring 130.

Figure 8F:
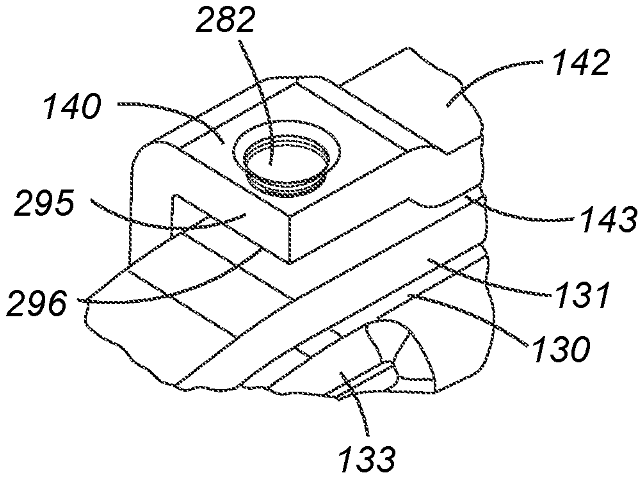

While in FIG. 8F, the dimple portion 282 may take a substantially cup-like form. As further shown in FIG. 8F, the first contact 143 with the upper spring member 131 is provided beneath the retainer member 142, while the second contact 296 with the upper spring member 131 is provided beneath an extended lower portion 295 beneath the dimple portion 282. That is, as more particularly illustrated in FIG. 8F, beneath the dimple portion 282 is the extended lower portion 295, which directly contacts the upper spring member 131 of the two-bodied spring 130 and provides the second contact 296 with the upper spring member 131.

The alternative embodiments for the dimple portion (as in dimple portions 280, 281, 282) will vary in size and location of the dimple portion within the top retainer member 140 of the retainer member 142.

The second contacts 286, 291, 296 with the upper spring member 131 of the two-bodied spring 130, in addition to the first contact 143 with the upper spring member 131 provided beneath the retainer member 142, advantageously increase the stiffness of the two-bodied spring 130.

Figure 9:
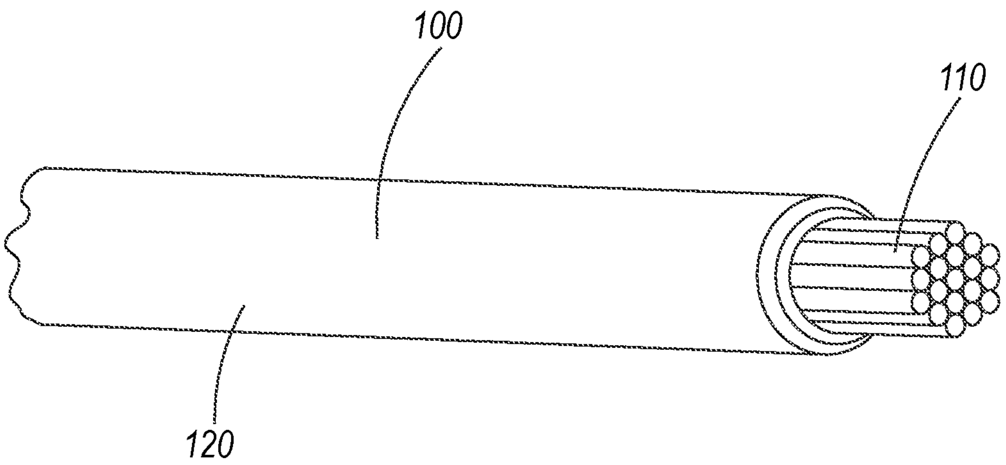
FIG. 9 shows a conventional electrical wire or cable for interaction with the electrical female terminal of this invention, the conventional electrical wire or cable having a wire insulation portion and a wire core portion at a front portion thereof.

FIG. 9 illustrates an exemplary electrical wire or cable 100 having the wire core portion 110 and the wire insulation portion 120, which are accommodated onto the electrical female terminal 1 of this invention. The priority or order of accommodation of the wire insulation portion 120 and the wire core portion 110 of electrical wire or cable 100 with the electrical female terminal 1 is not limited. thereto one embodiment of the wire fastening portion 3. The wire fastening portion 3 shown in this invention is one such embodiment of a wire fastening portion 3, but the current invention is not limited to this embodiment. However, as previously mentioned, the wire fastening portion 3 may be of a foldable crimp or clamping type as shown, but further may be an insulation displacement contact (IDC) type, or other similarly formed wire fastening means being integrally formed with a rear portion and preferably extending substantially with or in the lengthwise direction of the electrical female terminal 1, more specifically extending from the rear portion of the main body 3 of the electrical female terminal 1, and preferably able to interact with the wire insulation portion 120 and wire core portion 110 of the electrical wire or cable 100 to securely connect the electrical wire or cable 100 to the electrical female terminal 1. Further, as mentioned, the fastening of the electrical wire or cable 100 to the electrical female terminal 1 may include means of creating a secure and electrically conductive wire fastening including but not limited to welding, brazing, soldering and or other similar means. This invention is further not limited to the steps of insertion of the electrical wire or cable 100, wherein, the wire insulation portion 120 can be inserted first and the wire core portion 110 can be inserted second, and vice versa, and both may occur simultaneously depending on the structure and features of the wire fastening portion 3.

After or once the electrical wire or cable 100, having the wire insulation portion 120 and the wire core portion 110 thereof, is securely attached or inserted onto the electrical female terminal 1 by wire fastening means of the wire fastening portion 3 to the electrical female terminal 1, the electrical female terminal 1 is then in condition to be inserted into the connector assembly 90 or the like, as illustrated in FIGS. 10A and 10B.

Illustrated in FIG. 10A is the electrical female terminal 1, in a pre-lock position, while being inserted into the connector assembly 90 or the like, the electrical female terminal 1 being shown in a front elevational view. As shown in FIG. 10A, the electrical female terminal is inserted into the corresponding connector assembly 90, the lever member 25 is consequently positively pushed downward by contact with the connector assembly 90 or by a user or device, to allow the electrical female terminal 1 to move further into, and be further inserted into the connector assembly 90. As discussed earlier, and seen in FIG. 10A, during insertion of the electrical female terminal 1 into the connector assembly 90, the protruding members 35, 37 (see, e.g., FIGS. 2B and 8A) and the first and second support members 215, 220 (see, e.g., FIG. 8B) prevent or protect at least the lever member 25, the main body 5, and the electrical female terminal 1 from becoming substantially overstressed or deformed, and further, to retain the proper orientation or polarity of the electrical female terminal 1, as further described later.

FIG. 10B shows the fully inserted electrical female terminal 1 into the connector assembly 90. As shown in FIG. 10B, the lever member 25 retracts upward to a normal, relaxed state and is further preferably locked or secured at the unattached end portion 28 by a member (not shown) inside the connector assembly 90. After or at this time, as discussed earlier (see, e.g., FIG. 2C), the TPA device 300 is then able to be accommodated within the space 50 located above the neck member 52 and behind the main body 5, thereby assuring that the electrical female terminal 1 remains locked, secured, and correctly positioned within the connector assembly 90.

Further as in FIGS. 10A and 10B, the upper portions 200*a*, 210*a* and the lower portion 250 of the main body 5 are in such polarity or orientation, so as to assure correct orientation of the electrical female terminal 1 for accurate insertion and fitting of the present electrical female terminal 1 of this invention inside an upper portion 90*a* and a lower portion 90*b* of the connector assembly 90, respectively.

Also shown in FIGS. 10A and 10B are the upper portion 90*a* and the lower portion 90*b* of the connector assembly 90 or the like. The orientation or polarity of the electrical female terminal 1 of this invention is such that when the electrical female terminal 1 of this invention is oriented, inserted, and fitted with the connector assembly 90, the upper portion 200*a* at the front end portion 200 and the upper portion 210*a* at the back end portion 210 (see, FIG. 8B) of the main body 5 are respectively accommodated by the upper portion 90*a* of the connector assembly 90, while the lower portion 250 (see, FIG. 8B) of the main body 5 is respectively accommodated by the lower portion 90*b* of the connector assembly 90. The structural orientation or polarity shown in FIGS. 10A and 10B of the electrical female terminal 1 of this invention are such that the upper portions 200*a*, 210*a* of the main body 5 will reside or fit within the narrower upper portion 90*a*. Further here the upper portion 200*a* and upper portion 210*a* are offset to one side in comparison to the lower portion 250 of the main body 5. The lower portion 250 is wider than the upper portions 200*a*, 210*a* and resides within the wider lower portion 90*b* of the connector assembly 90. However, such structural orientations or polarities of the electrical female terminal 1 of this invention, when inserted or fitted into the connector assembly 90 are not limited thereto. That is, when the electrical female terminal 1 of this invention is oriented, inserted, and fitted with connector assembly 90, it may have the upper portions 200*a*, 210*a* of the main body 5 and the upper portion 90*a* of the connector assembly 90 being wider in comparison to the lower portion 250 of the main body 5 and the lower portion 90*b* of the connector assembly 90 (not shown). And similarly, the upper portions 200*a*, 210*a* may be centered (not shown) or offset (FIGS. 10A, 10B), compared to the lower portion 250 of the main body 5 while the electrical female terminal 1 is mating with the connector assembly 90 (not shown). The polarity or orientation of the electrical female terminal 1 and connector assembly 90 will be substantially similar to allow a substantial fitment thereby together.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. An electrical female terminal for insertion into a connector assembly, said electrical female terminal, comprising:

a wire fastening portion;

a main body attached to said wire fastening portion, wherein said main body includes a spring member and a lever member, wherein an unattached end portion of said lever member has a protrusion that deflects said lever member when said protrusion interacts with an internal protrusion of said connector assembly to prevent said electrical female terminal from falling out during use, said lever member being a substantially uniform beam having a beam cross-section that is substantially U-shaped and providing elasticity for latching and retention with a housing of said connector assembly, and wherein said electrical female terminal is integrally formed as a continuous piece, being folded, creased, or curved, to form a single construct, wherein the spring member has a lower spring member and an upper spring member, the upper spring member being above the lower spring member, and the lower spring member having a substantially curved portion that curves to an apex; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

2. The electrical female terminal according to claim 1, further comprising a recessed top face portion and a recessed bottom face portion at a leading end of said electrical female terminal to prevent damage to a seal when mating with said recessed top face portion and said bottom face portion.

3. The electrical female terminal according to claim 2, wherein said recessed top face portion is one of a flat surface recess, a concave surface recess, and a convex protrusion.

4. The electrical female terminal according to claim 1, wherein said top retainer member has a dimple portion above the corresponding extended lower portion in contact with said upper member of said spring member to increase the stiffness to said spring member.

5. The electrical female terminal according to claim 4, wherein said dimple portion has one of a substantially angled cup-like shape, a substantially V-shaped form, and a substantially cup-like form.

6. The electrical female terminal according to claim 1, wherein said protrusion of said lever member includes faces, which are angled relative to each other.

7. The electrical female terminal according to claim 1, wherein said lever member is comprised of a tang member that includes an overstress feature, said overstress feature having a protruding member located at one of a substantially front portion and a substantially intermediate portion of said tang member, and wherein said protrusion member has a substantially flat bottom edge.

8. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein a leading end of said electrical female terminal includes a recessed top face portion and a recessed bottom face portion to prevent damage to a seal when mating with said recessed top face portion and said bottom face portion, and wherein said electrical female terminal is integrally formed as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

9. The electrical female terminal according to claim 8, wherein an unattached end portion of said lever member has a protrusion that deflects said lever member when said protrusion interacts with an internal protrusion of said connector assembly to prevent said electrical female terminal from falling out during use.

10. The electrical female terminal according to claim 9, wherein said protrusion of said lever member includes faces, which are angled relative to each other.

11. The electrical female terminal according to claim 8, wherein said top retainer member has a dimple portion above the corresponding extended lower portion in contact with said upper member of said spring member to provide further stiffness to said spring member.

12. The electrical female terminal according to claim 11, wherein said dimple portion has one of a substantially angled cup-like shape, a substantially V-shaped form, and a substantially cup-like form.

13. The electrical female terminal according to claim 8, wherein said recessed top face portion is one of a flat surface recess, a concave surface recess, and a convex protrusion.

14. The electrical female terminal according to claim 8, wherein said lever member is comprised of a tang member that includes an overstress feature, said overstress feature having a protruding member located at one of a substantially front portion and a substantially intermediate portion of said tang member, and wherein said protrusion member has a substantially flat bottom edge.

15. An electrical female terminal for insertion into a connector assembly, said electrical female terminal, comprising:

a wire fastening portion;

a main body having a spring member and a lever member, said main body being attached to said wire fastening portion; and a retainer member having a contact, beneath said retainer member, with an upper member of said spring member, wherein said retainer member has a top retainer member having a dimple portion and a corresponding extended lower portion in yet another contact with said upper member of said spring member, wherein said electrical female terminal is integrally formed as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, said apex being located substantially proximate or near a leading end of said electrical female terminal.

16. The electrical female terminal according to claim 15, wherein a leading end of said electrical female terminal includes a recessed top face portion and a recessed bottom face portion to prevent damage to a seal when mating with said recessed top face portion and said bottom face portion.

17. The electrical female terminal according to claim 16, wherein said recessed top face portion is one of a flat surface recess, a concave surface recess, and a convex protrusion.

18. The electrical female terminal according to claim 15, wherein an unattached end portion of said lever member has a protrusion that deflects said lever member when said protrusion interacts with an internal protrusion of said connector assembly to prevent said electrical female terminal from falling out during use.

19. The electrical female terminal according to claim 18, wherein said protrusion of said lever member includes faces, which are angled relative to each other.

20. The electrical female terminal according to claim 15, wherein said dimple portion has one of a substantially angled cup-like shape, a substantially V-shaped form, and a substantially cup-like form.

21. The electrical female terminal according to claim 15, wherein said lever member is comprised of a tang member that includes an overstress feature, said overstress feature having a protruding member located at one of a substantially front portion and a substantially intermediate portion of said tang member, and wherein said protrusion member has a substantially flat bottom edge.

22. An electrical female terminal for insertion into a connector assembly, said electrical female terminal, comprising:

a wire fastening portion;

a main body attached to said wire fastening portion, wherein said main body includes a spring member and a lever member, wherein an unattached end portion of said lever member has a protrusion that deflects said lever member when said protrusion interacts with an internal protrusion of said connector assembly to prevent said electrical female terminal from falling out during use, said lever member being a substantially uniform beam having a beam cross-section that is substantially U-shaped and providing elasticity for latching and retention with a housing of said connector assembly, and wherein said electrical female terminal is integrally monolithic as a continuous piece, being folded, creased, or curved, to form a single construct, wherein the spring member has a lower spring member and an upper spring member, the upper spring member being above the lower spring member, and the lower spring member having a substantially curved portion that curves to an apex; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

23. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein a leading end of said electrical female terminal includes a recessed top face portion and a recessed bottom face portion to prevent damage to a seal when mating with said recessed top face portion and said bottom face portion, and wherein said electrical female terminal is integrally monolithic as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex; and a retainer member having a contact beneath thereof with said upper member of said spring member and another contact with said upper member of said spring member at a corresponding extended lower portion of a top retainer member of said retainer member to increase stiffness to said spring member, a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

24. An electrical female terminal for insertion into a connector assembly, said electrical female terminal, comprising:

a wire fastening portion;

a main body having a spring member and a lever member, said main body being attached to said wire fastening portion;

a top retainer member having a dimple portion and a corresponding extended lower portion in contact with an upper member of said spring member to provide stiffness to said spring member, wherein said electrical female terminal is integrally monolithic as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

25. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally formed as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein said apex is nearer to a front portion of the main body through which a male pin enters and contacts said apex; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

26. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally monolithic as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein said apex is nearer to a front portion of the main body through which a male pin enters and contacts said apex; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

27. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally formed as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein the upper spring member and the lower spring member of the spring member are integrally structured with each other and connected by at least a curved side member, the curved side member being substantially located at a back portion of the main body, and being covered and protected by a top retainer member; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

28. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally monolithic as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein the upper spring member and the lower spring member of the spring member are integrally structured with each other and connected by at least a curved side member, the curved side member being substantially located at a back portion of the main body, and being covered and protected by a top retainer member; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

29. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally formed as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein, in front of an end portion of said lower spring member, a guide member functions as a lead-in and support to guide a male pin for efficient and reliable insertion into said electrical female terminal; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

30. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally monolithic as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein, in front of an end portion of said lower spring member, a guide member functions as a lead-in and support to guide a male pin for efficient and reliable insertion into said electrical female terminal; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

31. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally formed as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, wherein said apex is nearer to a front portion of the main body through which a male pin enters and contacts said apex, and wherein a protruding member extends from the lever member and is located behind said apex away from a front portion of the main body, the protruding member providing an over-stressed protection for an end portion of the lower spring member during at least one of the handling, testing, and connector operations of the electrical female terminal; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

32. An electrical female terminal for insertion into a connector assembly, said electrical female terminal, comprising:

a wire fastening portion;

a main body attached to said wire fastening portion, wherein said main body includes a spring member, wherein said main body further includes a lever member, wherein said electrical female terminal is integrally monolithic as a continuous piece, being folded, creased, or curved, to form a single construct, and one which includes the main body, the spring member, and the wire fastening portion, the spring member having a lower spring member and an upper spring member, the upper spring member being above the lower spring member, and the lower spring member having a substantially curved portion that curves to an apex, and wherein said apex is nearer to a front portion of the main body through which a male pin enters and contacts said apex, and wherein a protruding member extends from the lever member and is located behind said apex away from the front portion of the main body, the protruding member providing an over-stressed protection for an end portion of the lower spring member during at least one of the handling, testing, and connector operations of the electrical female terminal; and a retainer member having a contact beneath said retainer member with said upper member of said spring member, and wherein said retainer member has a top retainer member, and wherein said retainer member has another contact with said upper member of said spring member at a corresponding extended lower portion of said top retainer member of said retainer member.

* * * * *